US011184489B1

(12) United States Patent
Mihara et al.

(10) Patent No.: US 11,184,489 B1
(45) Date of Patent: Nov. 23, 2021

(54) PRINTED MATERIAL DETECTION APPARATUS FOR DETECTING MANAGEMENT INFORMATION, IMAGE FORMING APPARATUS, PRINTED MATERIAL DETECTION SYSTEM AND RECORDING MATERIAL FOR THE SAME

(71) Applicant: FUJIFILM Business Innovation Corp., Tokyo (JP)

(72) Inventors: Akira Mihara, Ebina (JP); Takeshi Zengo, Ebina (JP); Mamoru Fujita, Ebina (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 17/143,291

(22) Filed: Jan. 7, 2021

(30) Foreign Application Priority Data

Aug. 27, 2020 (JP) .............................. JP2020-143488
Aug. 27, 2020 (JP) .............................. JP2020-143527

(51) Int. Cl.
*H04N 1/00* (2006.01)
*G01S 7/285* (2006.01)

(52) U.S. Cl.
CPC ......... *H04N 1/00342* (2013.01); *G01S 7/285* (2013.01)

(58) Field of Classification Search
CPC .................. H04N 1/00342; G01S 7/285
See application file for complete search history.

(56) References Cited

U.S. PATENT DOCUMENTS

| 2004/0066522 | A1 | 4/2004 | Yamaguchi et al. |
| 2007/0252704 | A1* | 11/2007 | Nagae ................ G06K 19/0776 340/572.8 |
| 2008/0304098 | A1 | 12/2008 | Fuse et al. |
| 2010/0110490 | A1* | 5/2010 | Mizumukai ........ H04N 1/00342 358/1.15 |
| 2017/0294943 | A1* | 10/2017 | Shen ..................... H04W 16/28 |
| 2020/0293848 | A1* | 9/2020 | Mochizuki ......... G06K 7/10009 |
| 2020/0348395 | A1* | 11/2020 | Belot ...................... G01S 7/285 |
| 2021/0151895 | A1* | 5/2021 | Ohkoshi .................. C09K 3/20 |

FOREIGN PATENT DOCUMENTS

| JP | 2004-110689 | 4/2004 |
| JP | 2004-341428 | 12/2004 |
| JP | 2005-081748 | 3/2005 |
| JP | 2008-090386 | 4/2008 |
| JP | 2008-305247 | 12/2008 |
| JP | 4849012 | 10/2011 |

OTHER PUBLICATIONS

English language machine translation of JP 2008-090386.
English language machine translation of JP 2005-081748.
English language machine translation of JP 2004-341428.

* cited by examiner

*Primary Examiner* — Juan M Guillermety
(74) *Attorney, Agent, or Firm* — Fildes & Outland, P.C.

(57) ABSTRACT

A printed material detection apparatus includes: a detector configured to transmit radio waves whose frequency of 1 GHz or more and 5 THz or less toward a printed material and to detect reflection or absorption of the radio waves.

15 Claims, 13 Drawing Sheets

TRANSMISSION/RECEPTION
ANTENNAS

PRINTED MATERIAL DETECTION APPARATUS FOR DETECTING MANAGEMENT INFORMATION, IMAGE FORMING APPARATUS, PRINTED MATERIAL DETECTION SYSTEM AND RECORDING MATERIAL FOR THE SAME

CROSS-REFERENCE TO RELATED APPLICATIONS

This application is based on and claims priority under 35 USC 119 from Japanese Patent Application No. 2020-143488 filed on Aug. 27, 2020 and Japanese Patent Application No. 2020-143527 filed on Aug. 27, 2020.

BACKGROUND

Technical Field

The present disclosure relates to a printed material detection apparatus, an image forming apparatus, a printed material detection system, and a recording material.

Related Art

For example, JP-A-2005-081748 discloses a printer apparatus configured not to perform printing on a sheet other than a sheet having a predetermined condition, and including a conveying means for conveying a sheet, a determination means for determining whether a sheet conveyed by the conveying means satisfies the predetermined condition, a printing means controlled by a control means and for printing information on the conveyed sheet, and a control means for, when it is determined by the determination means that the condition is satisfied, transmitting a signal for permitting printing to the printing means.

For example, JP-A-2004-341428 discloses a copying apparatus configured to read an image of a document by an image reading unit and to record an image on a sheet conveyed from a sheet feeder unit by an image recording unit, based on image data of the document read by the image reading unit, and including a special sheet detection means for detecting whether the sheet is a special sheet having metal fibers or metal-deposited glass fibers embedded therein or containing metal by irradiating the sheet with microwaves or the like, wherein when the special sheet detection means detects that the sheet, which is an image recording target, is a sheet other than the special sheet, recording of the image on the sheet is prohibited.

SUMMARY

In document management technology of the related art, for example, a recording medium having a structure attached thereon or a magnetic body embedded therein is used, and a special recording medium should be used in some cases.

Aspects of non-limiting embodiments of the present disclosure relate to a printed material detection apparatus, a printed material detection system and a recording material capable of detecting a printed material without using a special recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printed material detection apparatus including: a detector configured to transmit radio waves whose frequency is 1 GHz or more and 5 THz or less toward a printed material and to detect reflection or absorption of the radio waves.

BRIEF DESCRIPTION OF DRAWINGS

Exemplary embodiment(s) of the present invention will be described in detail based on the following figures, wherein.

DETAILED DESCRIPTION

Figure 1:
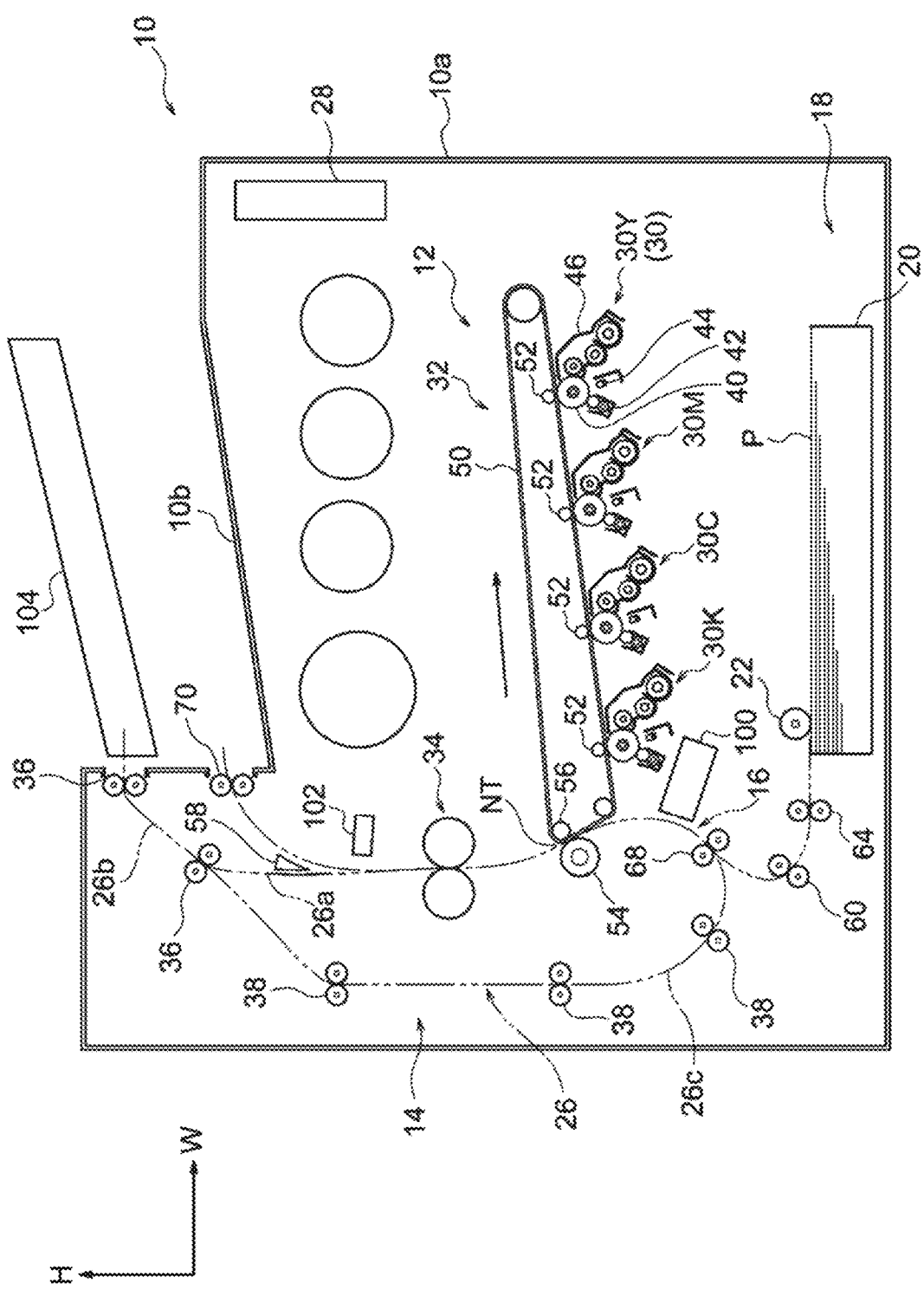
FIG. 1 is a schematic view depicting an image forming apparatus in accordance with a first exemplary embodiment.

Hereinbelow, exemplary embodiments of the present disclosure will be described with reference to the drawings. Note that, an arrow H appropriately shown in the drawings is a vertical direction, which indicates an upper and lower direction of an apparatus, an arrow W is a horizontal direction, which indicates a width direction of the apparatus, and an arrow D is a horizontal direction, which indicates an inner direction of the apparatus.

First Exemplary Embodiment

FIG. 1 is a schematic view depicting a configuration of an image forming apparatus 10 in accordance with a first exemplary embodiment.
(Overall Configuration of Image Forming Apparatus)

As shown in FIG. 1, the image forming apparatus 10 includes a first image forming unit 12 configured to form a toner image by an electrophotographic method, an accommodation unit 18 configured to accommodate recording media P, and a control unit 28 configured to control each unit. The image forming apparatus 10 also includes a conveyor unit 14 configured to convey the recording medium P accommodated in the accommodation unit 18 toward the first image forming unit 12 along a conveying path 16, to convey the recording medium P conveyed along the conveying path 16 along a reversal path 26 to reverse the front and back of the recording medium P and to again convey the same toward the first image forming unit 12. Here, the toner image is an example of the image, and the recording medium P is an example of the print medium. Note that, the image forming method by the first image forming unit 12 is not limited to the electrophotographic method, and may also be an inkjet method, for example.

The image forming apparatus 10 also includes a second image forming unit 100 arranged upstream with respect to a part facing the first image forming unit 12 in a conveying direction of the recording medium P. The second image forming unit 100 is configured to provide management information on the recording medium P. The second image forming unit 100 and a configuration associated with the second image forming unit will be described later.

The recording medium P is a recording medium having a base material formed of paper, or having a coat layer formed on the base material, for example. That is, the recording medium P is different from a special recording medium to which a structure such as an IC (Integrated Circuit) chip is attached or in which a magnetic body is embedded.

An overall configuration and operations of the image forming apparatus 10 are first described with the second image forming unit 100 being omitted. In the image forming apparatus 10, the toner image formed by the first image forming unit 12 is formed on a surface of the recording medium P that is conveyed along the conveying path 16. The recording medium P having the toner image formed thereon is discharged to an outside of an apparatus body 10a.

In the meantime, when forming a toner image on a rear surface of the recording medium P, the recording medium P having the toner image formed on the surface is conveyed along the reversal path 26, and a toner image again formed by the first image forming unit 12 is formed on the rear surface of the recording medium P. Then, the recording medium P is discharged to an outside of the apparatus body 10a.

[First Image Forming Unit 12]

The first image forming unit 12 includes plural toner image forming units 30 each configured to form a toner image of each color, and a transfer unit 32 configured to transfer the toner images formed in the toner image forming units 30 to the recording medium P. The first image forming unit 12 also includes a fixing device 34 configured to fix the toner images transferred to the recording medium P by the transfer unit 32 onto the recording medium P. The transfer unit 32 is an example of the provision unit. The fixing device 34 is an example of the heating unit. Note that, when an inkjet method is adopted instead of an electrophotographic method, a part that provides ink droplets to the recording medium P is an example of the provision unit, and a drying device configured to dry the ink droplets provided on the recording medium P is an example of the heating unit.

The toner image forming unit 30 is provided in plural so as to form a toner image of each color. In the present exemplary embodiment, the toner image forming units 30 of four colors of yellow (Y), magenta (M), cyan (C) and black (K) are provided. Note that, in descriptions below, when it is not necessary to distinguish yellow (Y), magenta (M), cyan (C) and black (K), Y, M. C, and K annexed to the reference signs are omitted.

The toner image forming units 30 of each color are basically similarly configured except toners to be used. More specifically, the toner image forming unit 30 includes a cylindrical image carrier 40 configured to rotate, and a charging device 42 configured to electrically charge the image carrier 40. The toner image forming unit 30 also includes an exposure device 44 configured to irradiate the electrically charged image carrier 40 with exposure light to form an electrostatic latent image, and a developing device 46 configured to develop, as a toner image, the electrostatic latent image by a developing agent G including toner. Thereby, in the toner image forming unit 30 of each color, a toner image of each color is formed using toner of each color.

The image carrier 40 of each color is in contact with a transfer belt 50 configured to circulate. The toner image forming units 30 of yellow (Y), magenta (M), cyan (C) and black (K) are aligned side by side in the horizontal direction in corresponding order from an upstream side in a circulation direction (refer to an arrow in FIG. 1) of the transfer belt 50.

The transfer unit 32 includes a transfer belt 50 wound on plural rolls (reference signs thereof are omitted) and configured to circulate in an arrow direction in FIG. 1, and primary transfer rolls 52 each arranged on an opposite side to the image carriers 40 of each color with the transfer belt 50 being interposed therebetween and each configured to transfer the toner images formed on the image carriers 40 of each color to the transfer belt 50.

The transfer unit 32 also includes a winding roll 56 on which the transfer belt 50 is wound and a secondary transfer roll 54 arranged on an opposite side to the winding roll 56 with the transfer belt 50 being interposed therebetween and configured to transfer the toner images transferred onto the transfer belt 50 to the recording medium P. A transfer nip NT for transferring the toner image to the recording medium P is formed between the secondary transfer roll 54 and the transfer belt 50.

In the above configuration, the toner images are primarily transferred onto the transfer belt 50 in order of yellow (Y), magenta (M), cyan (C) and black (K) by the primary transfer rolls 52. In the meantime, the toner images are transferred from the transfer belt 50 to the recording medium P that is conveyed nipped between the transfer belt 50 and the secondary transfer roll 54. The recording medium P having the toner images transferred thereon is delivered to the fixing device 34.

The fixing device 34 is arranged downstream with respect to the transfer nip NT in the conveying direction of the recording medium P. The fixing device 34 is configured to heat and pressurize the toner images transferred to the recording medium P and to fix the toner images on the recording medium P while conveying the recording medium P.

[Accommodation Unit 18]

The accommodation unit 18 includes an accommodation member 20 capable of accommodating the recording medium P, and a delivery roll 22 configured to deliver the uppermost recording medium P stacked in the accommodation member 20 to the conveying path 16.

[Conveyor Unit 14]

The conveyor unit 14 is arranged on one side (the left in FIG. 1) in a width direction of the apparatus with respect to the accommodation unit 18, and is configured to convey the recording medium P along the conveying path 16 in which the recording medium P delivered from the accommodation member 20 is conveyed. When forming a toner image on the rear surface of the recording medium P, the conveyor unit 14 conveys the recording medium P along the reversal path 26 for reversing the front and back by reversing (switching back) the conveying direction of the recording medium P.

The conveyor unit 14 includes a first conveying roll 64 configured to convey the recording medium P delivered from the accommodation member 20 along the conveying path 16, and a second conveying roll 60. The conveyor unit 14 also includes a stop roll 68 configured to convey the recording medium P along the conveying path 16, and a discharge roll 70. The secondary transfer roll 54 and the fixing device 34 are arranged between the stop roll 68 and the discharge roll 70.

The conveyor unit 14 also includes switching rolls 36 configured to convey the recording medium P along the reversal path 26 for reversing the front and back by reversing the conveying direction of the recording medium P, conveying rolls 38, and a switching member 58 configured to guide the recording medium P conveyed along the conveying path 16 to the reversal path 26.

The reversal path 26 has a branched path 26a branched from a part on a downstream side of the conveying path 16, and a switching path 26b extending from the branched path 26a, and the recording medium P is switched back along the switching path 26b. The reversal path 26 also has a J-shaped path 26c extending from an end portion of the switching path 26b in a direction different from the branched path 26a, and configured to guide the recording medium P toward the stop roll 68.

The conveyor unit 14 includes the two switching rolls 36 configured to switch back the recording medium P entering the switching path 26b from the branched path 26a, and the three conveying rolls 38 configured to convey the recording medium P switched back and entering the J-shaped path 26c toward the stop roll 68.

In the conveyor unit 14, when forming an image on the rear surface of the recording medium P, the switching member 58 guides the recording medium P having a toner image formed on the surface to the branched path 26a. The two switching rolls 36 receive and switch back the recording medium P entering the switching path 26b from the branched path 26a, thereby reversing the front and back of the recording medium P and conveying the same toward the J-shaped path 26c. The three conveying rolls 38 receive the recording medium P entering the J-shaped path 26c from the switching path 26b, convey the recording medium P toward the stop roll 68, and cause a tip end of the recording medium P to butt the stop roll 68. The stop roll 68 rotates in conformity to a timing at which a toner image is transferred, thereby conveying the recording medium P toward the transfer nip NT.

(Operations of Overall Configuration)

In the image forming apparatus 10, an image is formed as follows.

First, the charging device 42 of each color uniformly negatively charges a surface of the image carrier 40 of each color at a predetermined potential. Continuously, the exposure device 44 irradiates the electrically charged surface of the image carrier 40 of each color with exposure light, thereby forming an electrostatic latent image. The developing device 46 of each color develops the electrostatic latent image, thereby visualizing the same as a toner image. The toner image formed on the surface of the image carrier 40 of each color is transferred to the transfer belt 50 in order by the primary transfer roll 52.

The recording medium P delivered from the accommodation member 20 to the conveying path 16 by the delivery roll 22 is delivered to the transfer nip NT in which the transfer belt 50 and the secondary transfer roll 54 are in contact with each other. In the transfer nip NT, the recording medium P is conveyed between the transfer belt 50 and the secondary transfer roll 54, so that the toner images on the transfer belt 50 are transferred to a surface of the recording medium P.

The toner images transferred to the surface of the recording medium P are fixed on the recording medium P by the fixing device 34. Then, the recording medium P having the toner images fixed thereon is discharged to the discharge part 10b outside of the apparatus body 10a by the discharge roll 70.

In the meantime, when forming a toner image on the rear surface of the recording medium P, the recording medium P having the toner images formed on the surface is conveyed along the reversal path 26, so that the front and back of the recording medium are reversed and the recording medium is again conveyed to the transfer nip NT. Then, toner images formed via the processes similar to the above-described processes are transferred to the rear surface of the recording medium P. The toner images transferred to the rear surface of the recording medium P are fixed on the recording medium P by the fixing device 34. Then, the recording medium P having the toner images fixed thereon is discharged to the discharge part 10b outside of the apparatus body 10a by the discharge roll 70.

(Configuration)

Subsequently, the second image forming unit 100 and a configuration relating to the same are described.

The image forming apparatus 10 includes the second image forming unit 100 arranged upstream with respect to the transfer unit 32 in which the toner images by the first image forming unit 12 are transferred, in the conveying direction of the recording medium P. The image forming apparatus 10 also includes a management information detection unit 102 arranged downstream with respect to the fixing device 34 and a collection unit 104 arranged downstream with respect to the switching rolls 36, in the conveying direction of the recording medium P. The second image forming unit 100 and the management information detection unit 102 are arranged on the same side as the first image forming unit 12 with respect to the conveying path 16 along which the recording medium P is conveyed.

[Second Image Forming Unit 100]

As described above, the second image forming unit 100 is configured to provide management information on the recording medium P. In the image forming apparatus 10, for example, when a confidential management level of an image that is formed on the recording medium P by the first image forming unit 12 is higher than a predetermined level, management information is provided on the recording medium P by the second image forming unit 100. In the present disclosure, the "confidential management" refers to managing information (hereinbelow, referred to as "confidential information') about an image that should be kept in a confidential state so as to keep it in the confidential state. In the present disclosure, exemplary embodiments of the "confidential management" include four following examples. First, the confidential information is recorded on a recording medium that meets a predetermined requirement. Second, a recording medium on which the confidential information is recorded and a recording medium on which the confidential information is not recorded are identified. Third, a recording medium on which the confidential information is recorded is kept in a building or a room that meets a predetermined requirement. Fourth, a recording medium on which the confidential information is recorded is not taken out from any building or room. The "management information" refers to information that is annexed to the recording medium P for management so as to keep it in the confidential state. The "management information" is information that is detectable by a printed material detection apparatus 150 (refer to FIG. 3), which will be described later.

For example, the control unit 28 determines whether a confidential management level of an image that is formed on the recording medium P by the first image forming unit 12 is higher than the predetermined level, according to image data that is formed by the first image forming unit 12. In a storage unit (not shown) provided to the control unit 28, for example, a table indicative of confidential information such as a keyword, a sentence, a figure and the like that should be confidentially managed is stored. The control unit 28 compares the image data and the confidential information of the table, and determines whether the confidential management level of the image is higher than the predetermined level.

The second image forming unit 100 has only to provide the management information on the recording medium P, and an image forming method is not limited. The image forming method used by the second image forming unit 100 may be selected from image forming methods such as an electrophotographic method, a droplet ejection method such as an inkjet, a stamping method, a coating method, a silk printing method, and the like.

Figure 2A:
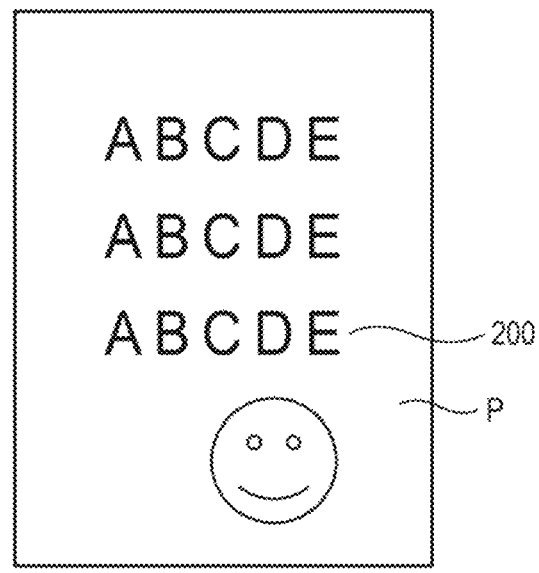
FIG. 2A depicts an example of a recording medium on which an image is formed by the image forming apparatus of the first exemplary embodiment.
Figure 2B:
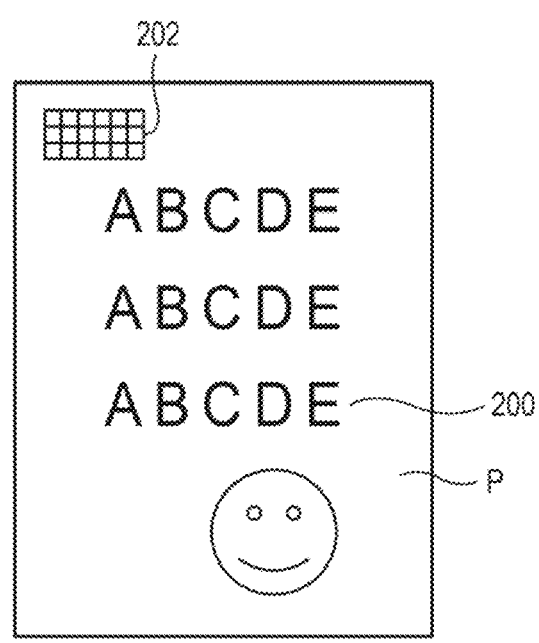
FIG. 2B depicts an example of a recording medium on which an image for detection is provided together with an image.

FIG. 2A depicts an example of an image 200 that is formed on the recording medium P by the first image forming unit 12. When a confidential management level of the image 200 formed on the recording medium P is higher than the predetermined level, the second image forming unit 100 provides an image for detection 202, which is an example of the management information, on the recording medium P, as shown in FIG. 2B. The image for detection 202 is provided as a rectangular mesh-shaped image at a right upper portion of the recording medium P, for example. The image for detection 202 is provided in a position not overlapping the image 200, for example. Note that, the position and shape of the image for detection 202 that is provided on the recording medium P may be changed.

[Recording Material that is Used in Second Image Forming Unit 100]

Here, a recording material that is used in the second image forming unit 100 is described. For the image for detection 202, a recording material having a reflectance or absorptivity of radio waves that is different from the recording material used when forming the toner image in the first image forming unit 12 is used. The recording material is attached on the surface of the recording medium P to form the image for detection 202 that reflects or absorbs at least a part of radio waves whose frequency is equal to or higher than 1 GHz and equal to or lower than 5 THz, thereby enabling the recording medium P to be detected by the printed material detection apparatus 150. The image for detection 202 has only to reflect or absorb at least a part of radio waves whose frequency is equal to or higher than 1 GHz and equal to or lower than 5 THz. The image for detection 202 may reflect or absorb an entire range of radio waves whose frequency is equal to or higher than 1 GHz and equal to or lower than 5 THz, or may reflect radio waves in a certain region having a frequency equal to or higher than 1 GHz and equal to or lower than 5 THz and absorb radio waves in another region.

The recording medium P on which the image for detection 202 is formed by the recording material of the present disclosure may have improved handleability to a special recording medium having a structure such as an IC chip attached thereto or having a magnetic body embedded therein. When the recording material of the present disclosure is used, there may be few restrictions on a type of the recording medium on which the image for detection 202 is to be formed, the manufacturing cost of the recording medium having the image for detection may be low, and a thickness of the recording medium having the image for detection formed thereon may be relatively thin and highly uniform, which may improve a stacking property.

The image for detection 202 may be an image that reflects or absorbs at least a part of millimeter waves or sub-millimeter waves. The image for detection 202 may be an image that reflects or absorbs at least a part of millimeter waves. The image for detection 202 may be an image that reflects at least a part of millimeter waves, from standpoints of resolution, transmittance and safety of radio waves for detection.

The image for detection 202 may be an image that reflects or absorbs at least a part of terahertz waves, from a standpoint of resolution of the image for detection.

In the present disclosure, radio waves in a region ranging from a frequency of 30 GHz to a frequency of 300 GHz of radio waves in a region ranging from a frequency of 1 GHz to a frequency of 5 THz are referred to as "millimeter waves", radio waves in a region ranging from a frequency of 300 GHz to a frequency of 3000 GHz (=3 THz) are referred to as "sub-millimeter waves", and radio waves in a region ranging from a frequency of 3 THz to a frequency of 5 THz are referred to as "terahertz waves".

Also, in a case when the image for detection 202 has a mesh pattern, the mesh size (i.e., an opening of a mesh) may be set according to a wavelength of radio waves used in the printed material detection apparatus 150. For example, the mesh size of the mesh pattern may be set to a size at which radio waves may shield the image for detection 202 (i.e., radio waves are difficult to pass). When a wavelength of radio waves is denoted as λ, the size of the mesh size of the mesh pattern may be equal to or smaller than ½λ, for example. Also, a line width of the mesh-shaped image may be smaller than a width of the opening. The smaller the mesh size of the mesh pattern is, the higher the effect of shielding radio waves is.

An example of the exemplary embodiment of the image for detection 202 is an image that reflects or absorbs at least a part of the millimeter waves. As the image for detection 202 that reflects or absorbs at least a part of the millimeter waves, an image that reflects or absorbs at least a part of the millimeter waves in a region ranging from a frequency of 70 GHz to a frequency of 90 GHz may be used.

The recording material of the present disclosure may contain at least one selected from a group consisting of an electroconductive material, a dielectric material and a magnetic material, so as to form the image for detection. An electroconductive material, a dielectric material or a magnetic material included in the recording material of the present disclosure is included in the image for detection, so that the image for detection may exhibit radio wave reflection or absorption performance.

Examples of the electroconductive material, the dielectric material or the magnetic material include metal particles such as silver, copper, nickel and the like; metal powder pigments such as aluminum, brass, bronze, nickel, stainless steel, zinc and the like; metal oxide particles such as indium tin oxide (ITO), tin oxide, indium oxide, zinc oxide, indium zinc oxide and the like; ferrite particles, magnetite particles, carbonyl iron powder, carbon; particles made to have radio wave absorption performance by combining these materials and resin.

The recording material of the present disclosure may also contain a coloring material (for example, pigment, dye and the like) for coloring the image for detection. The recording material of the present disclosure may also contain a resin (for example, polyester resin, acrylic resin and the like) from a standpoint of fixability on the surface of the recording medium. The recording material of the present disclosure may also contain a solvent from a standpoint of securing flowability of the recording material.

An amount of provision per a unit area of the recording material of the present disclosure on the recording medium is not particularly limited, and is an amount of provision enabling a formed image to function as an image for detection. The amount of provision of the recording material of the present disclosure on the recording medium may be set based on a radio wave reflectance or a radio wave absorptivity of the image for detection. A difference between the radio wave reflectance or radio wave absorptivity of the image for detection and a radio wave reflectance or radio wave absorptivity of a surface of a recording medium (for example, a surface of a sheet) may be 18 dB or greater, and preferably 40 dB or greater.

Examples of the exemplary embodiment of the recording material of the present disclosure include a liquid composition or a paste composition. The liquid composition is, for example, ink. The recording material may also be heated by the fixing device 34 of the image forming apparatus 10.

As the recording material of the liquid composition, ink for inkjet recording, ink that is charged in a pen-shaped device, and ink for stamp may be exemplified. As the recording material of the paste composition, paste for stamp, paste for screen print, and paste for offset print may be exemplified.

The liquid composition or the paste composition is at least one selected from a group consisting of an electroconductive material, a dielectric material and a magnetic material, and has such a form that a particulate material is dispersed in a solvent.

The image for detection provided on the recording medium of the present disclosure may be an image having an electroconductive property from a standpoint of facilitating detection by the printed material detection apparatus 150.

[Management Information Detection Unit 102]

The management information detection unit 102 is configured to detect that the image for detection 202 is provided on the recording medium P. For example, in a case where the second image forming unit 100 provides the recording medium P with the image for detection 202, the management information detection unit 102 detects that the image for detection 202 is actually provided on the recording medium P, on a further downstream side than the second image forming unit 100 in the conveying direction of the recording medium P. For example, the management information detection unit 102 transmits radio waves whose frequency is equal to or higher than 1 GHz and equal to or lower than 5 THz toward the recording medium P and receives the radio waves reflected on the recording medium P, thereby detecting that the image for detection 202 is provided on the recording medium P. For example, in a case where the image for detection 202 is provided on the recording medium P, the radio waves are reflected or absorbed by the image for detection 202. In a case where the image for detection 202 is not provided on the recording medium P (including a case where the image for detection 202 is insufficiently formed), most of the radio waves pass through the recording medium P. For this reason, it may be possible to detect that the image for detection 202 is provided on the recording medium P by the radio waves received in the management information detection unit 102. The information detected by the management information detection unit 102 is input to the control unit 28.

[Collection Unit 104]

The collection unit 104 is a box-shaped member and is configured to collect therein the recording medium P. In the image forming apparatus 10, the switching rolls 36 are rotated in the conveying direction (an opposite direction to the switching direction), so that the recording medium P is collected in the collection unit 104. When providing the image for detection 202 on the recording medium P, if it is not detected by the management information detection unit 102 that the image for detection 202 is provided on the recording medium P, the control unit 28 operates the switching member 58 to convey the recording medium P to the branched path 26a. The control unit 28 also rotates the switching rolls 36 in the conveying direction, thereby collecting the recording medium P in the collection unit 104. Thereby, in a case where the image for detection 202, which should be confidentially managed, is not provided to the recording medium P, the recording medium P is collected in the collection unit 104 without being discharged to the discharge part 10b.

[Printed Material Detection Apparatus 150]

Subsequently, an example of the printed material detection apparatus is described.

Figure 3:
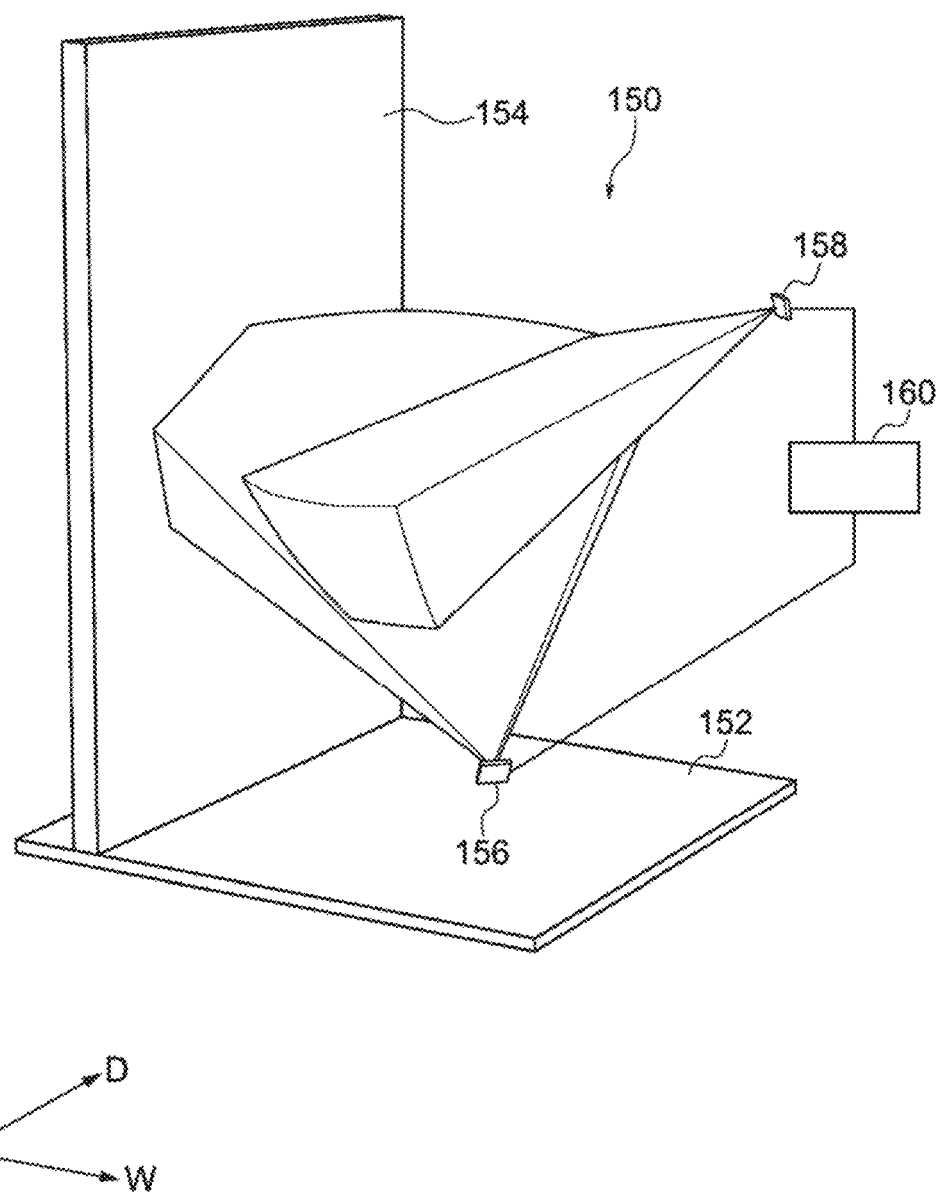
FIG. 3 is a perspective view depicting an example of a printed material detection apparatus configured to detect a printed material.
Figure 4:
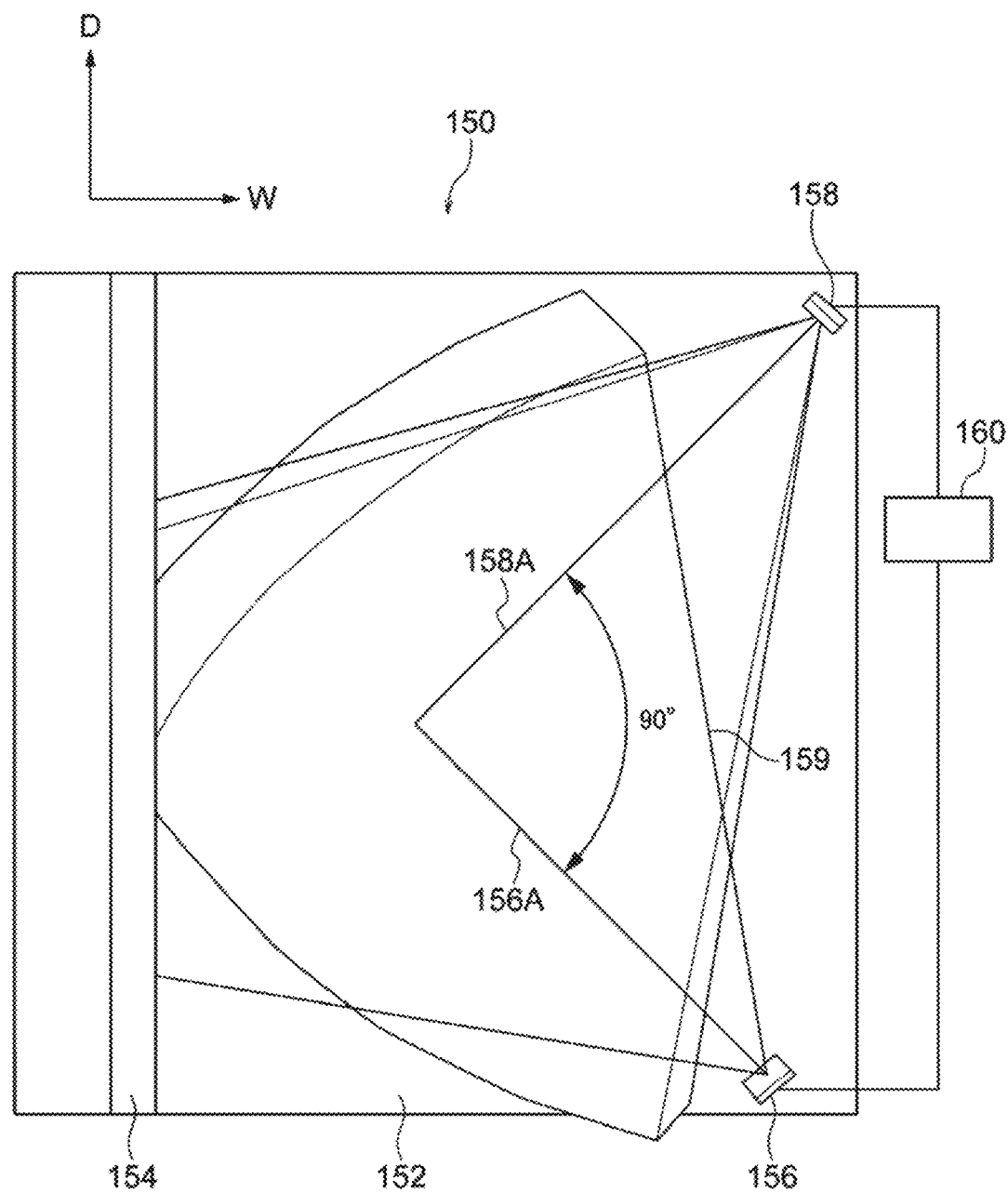
FIG. 4 is a plan view depicting the example of the printed material detection apparatus configured to detect a printed material.

As shown in FIGS. 3 and 4, the printed material detection apparatus 150 includes a floor surface 152, and a radio wave absorbing body 154 arranged in a direction intersecting with (in an example of the exemplary embodiment of the present disclosure, orthogonal to) the floor surface 152. The printed material detection apparatus 150 also includes a transmission/reception antenna 156 configured to transmit and receive radio waves on the floor surface 152-side, and a transmission/reception antenna 158 configured to transmit and receive radio waves on a side distant from the floor surface 152. The printed material detection apparatus 150 also includes a control unit 160 electrically connected to each of the transmission/reception antenna 156 and the transmission/reception antenna 158.

In the printed material detection apparatus 150, the transmission/reception antennas 156 and 158 are configured to transmit the radio waves whose frequency is equal to or higher than 1 GHz and equal to or lower than 5 THz toward the printed material and to detect reflection or absorption of the radio waves. The transmission/reception antennas 156 and 158 are an example of the detection unit. The transmission/reception antennas 156 and 158 are also an example of the transmission unit. That is, the printed material detection apparatus 150 includes two sets of the transmission/reception antennas 156 and 158. Also, the "printed material" is not limited to a printed material in a narrow sense on which a toner image is formed by the image forming apparatus 10. That is, the "printed material" indicates a printed material in a broad sense that does not limit the printing method.

In an example of the exemplary embodiment of the present disclosure, the printed material detection apparatus 150 is provided at an exit of a room in which the image forming apparatus 10 is equipped. Thereby, a printed material detection system including the image forming apparatus 10 and the printed material detection apparatus 150 is configured. For example, when an image having a high confidential management level is formed on the recording medium P by the image forming apparatus 10, the printed material detection system detects taking out of the recording medium P (i.e., the printed material) by the printed material detection apparatus 150.

The floor surface 152 is a bottom surface on which a user may walk. For example, a user who carries the recording medium P having an image formed thereon walks on the floor surface 152.

The transmission/reception antenna 156 and the transmission/reception antenna 158 are arranged in positions distant from the radio wave absorbing body 154 and at heights different in the upper and lower direction (refer to FIG. 3). The transmission/reception antenna 156 and the transmission/reception antenna 158 are also arranged at an interval along the radio wave absorbing body 154, in a plan view shown in FIG. 4. The transmission/reception antenna 156 and the transmission/reception antenna 158 are also arranged on different planes (refer to FIG. 3).

The transmission/reception antenna 156 is configured to transmit radio waves obliquely upward from the floor surface 152-side toward the radio wave absorbing body 154 and to receive reflected radio waves. The transmission/reception antenna 158 is also configured to transmit radio waves obliquely downward from a side distant from the floor surface 152 toward the radio wave absorbing body 154 and to receive reflected radio waves. The arrangement positions of the transmission/reception antenna 156 and the transmission/reception antenna 158 are set so that a center line 156A of the radio waves transmitted from the transmission/reception antenna 156 and a center line 158A of the radio waves transmitted from the transmission/reception antenna 158 form an angle equal to or smaller than 90°. The angle between the center line 156A of the radio waves transmitted from the transmission/reception antenna 156 and the center line 158A of the radio waves transmitted from the transmission/reception antenna 158 may also be equal to or greater than 30°. The radio waves transmitted from transmission/reception antenna 156 and the radio waves transmitted from the transmission/reception antenna 158 form an overlapping part 159 of a three-dimensional space. Here, the "center line of the radio waves" refers to a normal line that passes through a center of a figure of an antenna radiation surface. The transmission/reception antennas 156 and 158 are arranged so that the center line 156A of the radio waves and the center line 158A of the radio waves intersect three dimensionally, instead of intersecting on a plane.

The radio waves that are transmitted from the transmission/reception antennas 156 and 158 are radio waves whose frequency is equal to or higher than 1 GHz and equal to or lower than 5 THz, as described above. In an example of the exemplary embodiment of the present disclosure, the radio waves that are transmitted from the transmission/reception antennas 156 and 158 are millimeter waves.

The transmission/reception antennas 156 and 158 are configured to transmit the radio waves and to receive the radio waves reflected in the vicinity of the radio wave absorbing body 154, thereby detecting that the recording medium P is formed with an image having a high confidential management level. That is, the surface of the recording medium P is formed with the image for detection 202, so that the recording medium P is detected by the transmission/reception antennas 156 and 158. When detecting the image for detection 202 or the recording medium P having the same by the transmission/reception antennas 156 and 158, in a case of detection in a short distance (for example, within 10 m), the detection may be performed with low outputs from the transmission/reception antennas 156 and 158. Therefore, it may be possible to use the relatively small transmission/reception antennas 156 and 158 having a level that has no effect on a human body, so that it may be possible to suppress an effect on the human body. An effect on the human body may be suppressed relatively small. Since the radio waves whose frequency is equal to or higher than 1 GHz and equal to or lower than 5 THz may penetrate a shield such as fabric or paper, the image for detection or the recording medium having the same may be detected even though there are shields such as a cloth, an envelope, a bag and the like.

In a case where the recording medium P is provided with the image for detection 202, most of the radio waves pass through (i.e., penetrate) a part of the recording medium P where the image 200 is formed. However, at least a part of the radio waves is reflected or absorbed by the image for detection 202. In an example of the exemplary embodiment of the present disclosure, since the radio wave absorbing body 154 is provided, the image for detection 202 may be an image for detection that reflects at least a part of the radio waves. A principle of detecting the image for detection 202 will be described later.

The radio wave absorbing body 154 has a function of absorbing radio waves. The radio wave absorbing body 154 is arranged with respect to the transmission/reception antennas 156 and 158 so as to sandwich a position through which a printed material passes (i.e., a user who carries a printed material passes) therebetween. The radio waves transmitted from the transmission/reception antennas 156 and 158 collide with the radio wave absorbing body 154, so that at least a part of the radio waves is absorbed by the radio wave absorbing body 154. Thereby, the radio waves, which are reflected in the vicinity of the radio wave absorbing body 154 and return to the transmission/reception antennas 156 and 158, of the radio waves transmitted from the transmission/reception antennas 156 and 158 are reduced.

The entire radio wave absorbing body 154 or a side of the radio wave absorbing body 154 facing toward the transmission/reception antennas 156 and 158 is formed of a material that may easily absorb radio waves. Examples of the material that may easily absorb radio waves include ferrite, magnetite, carbonyl iron powders, carbon or a material made to have radio wave absorption performance by combining these materials and resin. As the material that may easily absorb radio waves, for example, a composite radio wave absorbing body in which a radio wave absorbing material using ohmic loss of carbon and a radio wave absorbing material using magnetic loss of ferrite are combined may also be used. As the material that may easily absorb radio waves, for example, a composite magnetic radio wave absorbing material in which carbonyl iron powders are mixed with a synthetic rubber may also be used.

Detection signals of the transmission/reception antennas 156 and 158 are input to the control unit 160. When the recording medium P having the image for detection 202 formed thereon is detected, the control unit 160 causes an alert generation device (not shown) and a gate blocking device (not shown) arranged at an exit to operate, according to the detection signals of the transmission/reception antennas 156 and 158. An alert is generated from the alert generation device and a gate is blocked by the gate blocking device, so that it may be possible to suppress the recording medium P having the image for detection 202 formed thereon from being taken out.

Figure 5:
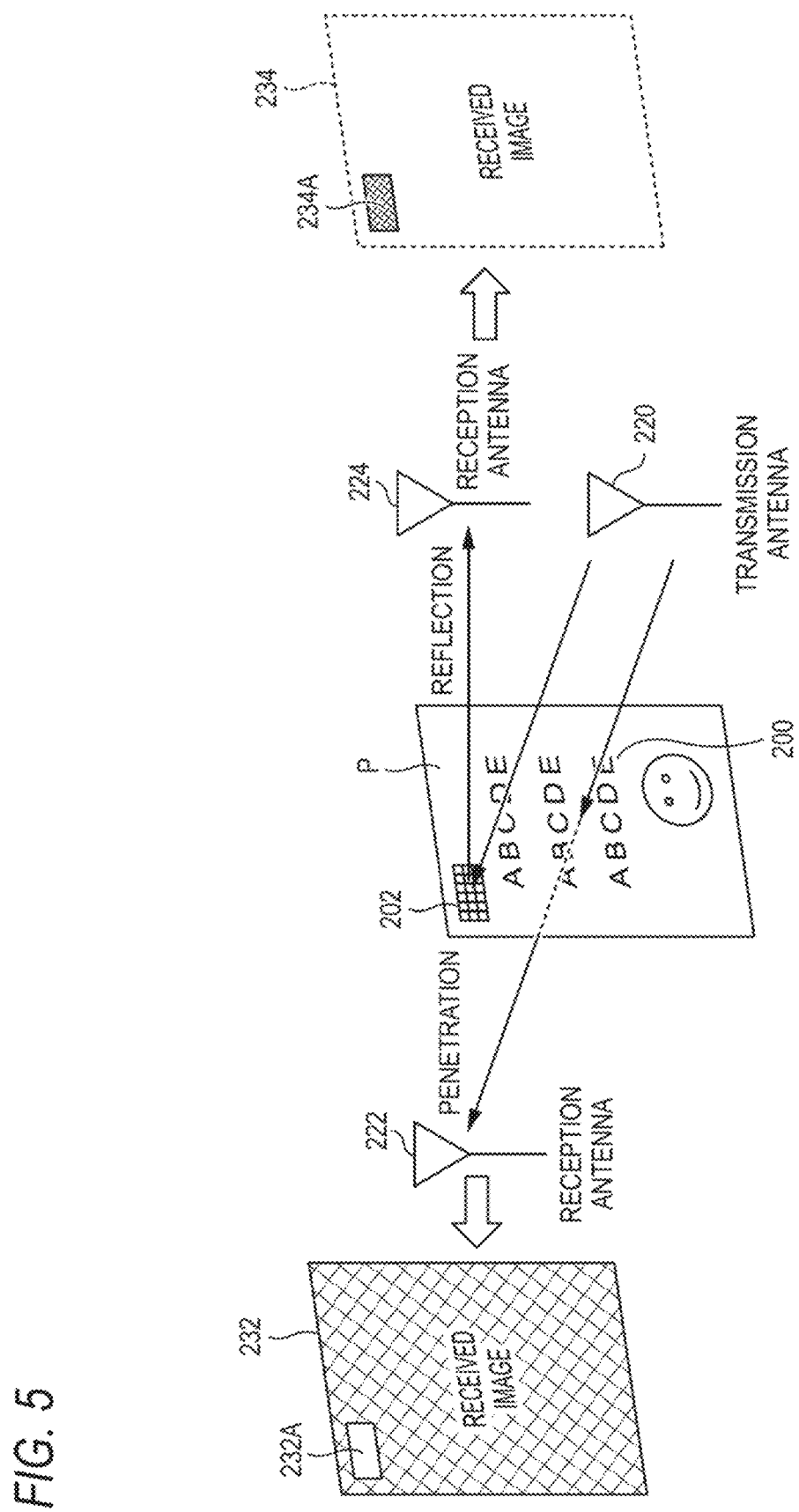
FIG. 5 illustrates a principle of detecting a printed material on which an image for detection is provided.

FIG. 5 depicts a principle of detecting the recording medium P having the image for detection 202 formed thereon. As shown in FIG. 5, a transmission antenna 220 configured to transmit radio waves and a reception antenna 222 configured to receive the radio waves are arranged with the recording medium P being interposed therebetween. A reception antenna 224 configured to receive radio waves may also be arranged on the same side as the transmission antenna 220 configured to transmit radio waves toward the recording medium P.

For example, the image for detection 202 is an image for detection that reflects at least a part of the radio waves. In this case, most of the radio waves transmitted from the transmission antenna 220 pass through the part of the recording medium P where the image 200 is formed but at least a part of the radio waves is reflected by the image for detection 202. Thereby, a received image 232 acquired by the reception antenna 222 becomes an image where a pan 232A of the image for detection 202 of the recording medium P is missed. For this reason, it may be possible to detect the recording medium P having the image for detection 202 formed thereon by the reception antenna 222.

A received image 234 acquired by the reception antenna 224 becomes an image where only a part 234A of the image for detection 202 of the recording medium P appears. For this reason, it may be possible to detect the recording medium P having the image for detection 202 formed thereon by the reception antenna 224.

As shown in FIG. 3, in the printed material detection apparatus 150, most of the radio waves transmitted from the transmission/reception antennas 156 and 158 pass through a part of the recording medium P on which the image 200 is formed and collide with the radio wave absorbing body 154, so that at least a part of the radio waves is absorbed by the radio wave absorbing body 154. At least a part of the radio waves transmitted from the transmission/reception antennas 156 and 158 is reflected on the image for detection 202 on the recording medium P, and the reflected radio waves are received by the transmission/reception antennas 156 and 158. For this reason, a received image acquired by the transmission/reception antennas 156 and 158 becomes an image where only a part 234A of the image for detection 202 on the recording medium P appears. For this reason, it may be possible to detect the recording medium P having the image for detection 202 formed thereon by the transmission/reception antennas 156 and 158.

Figure 6:
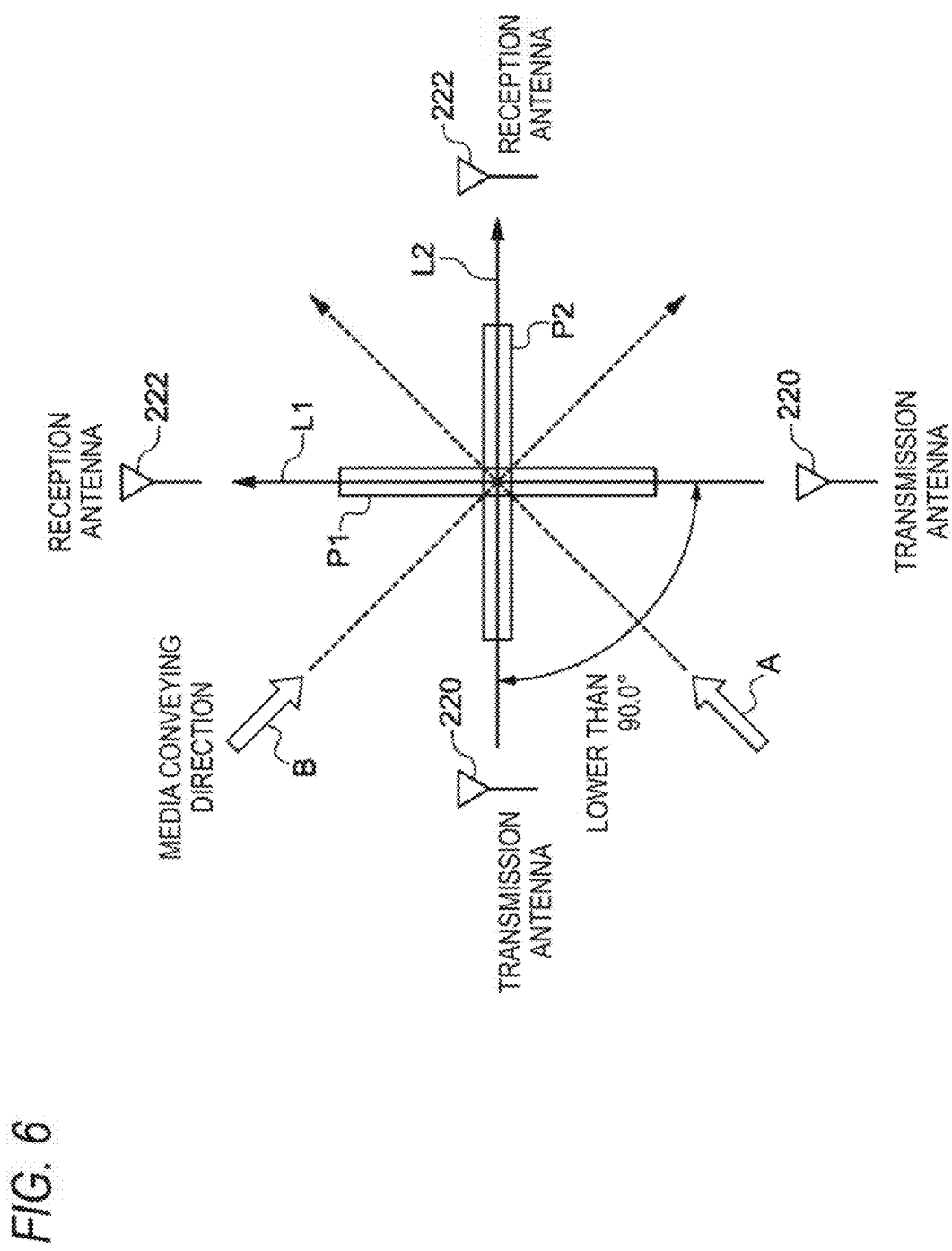
FIG. 6 illustrates a principle of detecting the printed material, according to a position of the printed material on which the image for detection is provided.

FIG. 6 depicts a principle of detecting the recording medium P having the image for detection 202 formed thereon, according to a position of the detection unit. In FIG. 6, recording media P1 and P2 and the like are pictorially shown so as to easily understand configurations.

As shown in FIG. 6, two sets of the transmission antennas 220 and the reception antennas 222 are arranged. A center line L1 indicating a direction of radio waves from the transmission antenna 220 to the reception antenna 222 of one side and a center line L2 indicating a direction of radio waves from the transmission antenna 220 to the reception antenna 222 of the other side intersect near centers of positions where the two sets of the transmission antennas 220 and the reception antennas 222 are arranged. For example, as seen from above, an angle between the center line L1 and the center line L2 is set to an angle (in FIG. 6, 90°) equal to or smaller than 90°. Also, the angle between the center line L1 and the center line L2 may be equal to or greater than 30°. Although not shown, the two sets of the transmission antennas 220 and the reception antennas 222 are arranged on different planes other than the same plane.

The recording media P1 and P2 are conveyed in a direction of an arrow A or an arrow B, for example. For example, a case where the recording medium P1 is arranged vertically in a position overlapping the center line L1 of the transmission antenna 220 and the reception antenna 222 of one side is described. In this case, since the radio waves are difficult to reflect on the image for detection 202, the transmission antenna 220 and the reception antenna 222 of one side are difficult to detect the image for detection 202 on the recording medium P1. However, the recording medium P1 intersects with the center line L2 of the transmission antenna 220 and the reception antenna 222 of the other side. For this reason, at least a part of the radio waves is reflected on the image for detection 202, so that the transmission antenna 220 and the reception antenna 222 of the other side may detect the image for detection 202 on the recording medium P1.

Similarly, a case where the recording medium P2 is vertically arranged in a position overlapping the center line L2 of the transmission antenna 220 and the reception antenna 222 of the other side is described. In this case, since the radio waves are difficult to reflect on the image for detection 202, the transmission antenna 220 and the reception antenna 222 of the other side are difficult to detect the image for detection 202 on the recording medium P2. However, the recording medium P2 intersects with the center line L1 of the transmission antenna 220 and the reception antenna 222 of one side. For this reason, at least a part of the radio waves is reflected on the image for detection 202, so that the transmission antenna 220 and the reception antenna 222 of one side detects the image for detection 202 on the recording medium P2.

For example, if the two sets of transmission antennas and reception antennas are arranged on the same plane along the surface of FIG. 6, the radio waves of the two sets of the transmission antennas and the reception antennas are difficult to reflect on an image for detection on a recording medium arranged along the surface of FIG. 6, so that it may be difficult to detect the image for detection on the recording medium.

In contrast, when the two sets of the transmission antennas 220 and the reception antennas 222 are arranged on the different planes, at least a part of the radio waves is reflected on the image for detection 202 on any one side of the two sets of the transmission antennas 220 and the reception antennas 222. For this reason, even when the recording medium P faces toward any direction, it may be possible to detect the image for detection 202 on the recording medium P on at least one side of the two sets of the transmission antennas 220 and the reception antennas 222.

As shown in FIG. 3, in the printed material detection apparatus 150, the transmission/reception antenna 156 and the transmission/reception antenna 158 are arranged on the different planes. The transmission/reception antenna 156 and the transmission/reception antenna 158 are also arranged so that the center line 156A of the radio waves transmitted from the transmission/reception antenna 156 and the center line 158A of the radio waves transmitted from the transmission/reception antenna 158 form an angle equal to or smaller than 90°. The angle between the center line 156A of the radio waves transmitted from the transmission/reception antenna 156 and the center line 158A of the radio waves transmitted from the transmission/reception antenna 158 is also set to 30° or greater, for example. For this reason, even when the recording medium P faces toward any direction, it may be possible to detect the image for detection 202 on the recording medium P by the two sets of the transmission/reception antennas 156 and 158.

Figure 7:
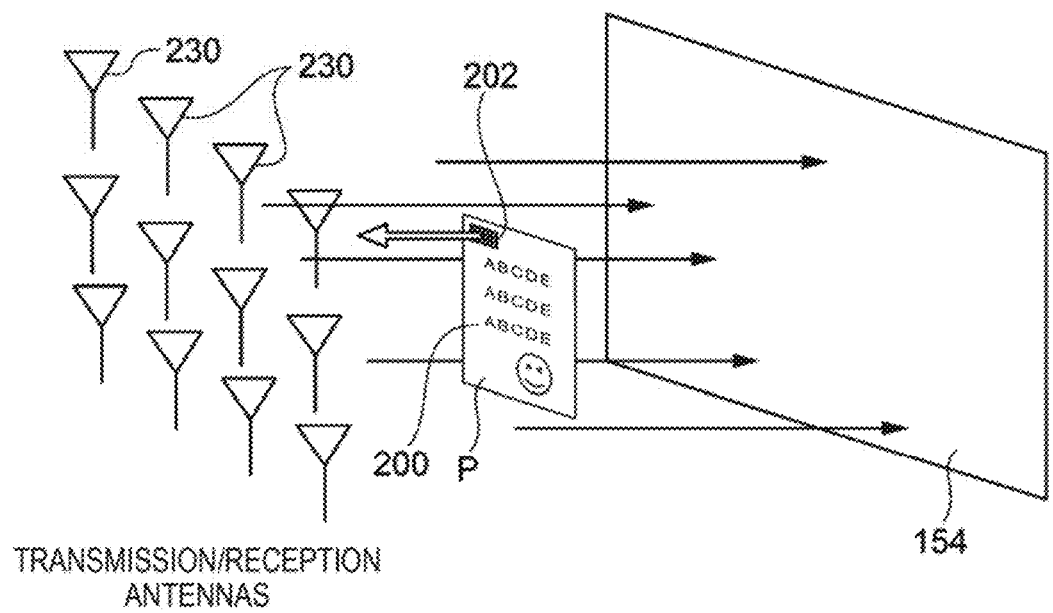
FIG. 7 illustrates a state of radio waves in a case where a radio wave absorbing body is arranged so as to sandwich a printed material between the radio wave absorbing body and transmission/reception antennas.

FIG. 7 illustrates a principle of detecting the recording medium P having the image for detection 202 formed thereon in a case where the radio wave absorbing body 154 is arranged.

As shown in FIG. 7, in a case where the recording medium P having the image for detection 202 formed thereon is arranged between plural transmission/reception antennas 230 and the radio wave absorbing body 154, most of the radio waves pass through a part of the recording medium P where the image 200 is formed. The radio waves collide with the radio wave absorbing body 154, so that at least a part of the radio waves is absorbed by the radio wave absorbing body 154. For this reason, the radio waves that are received by the transmission/reception antennas 230 are reduced. At least a part of the radio waves is also reflected on the image for detection 202 on the recording medium P, and the reflected radio waves are absorbed by the transmission/reception antennas 230. For this reason, an amount of the radio waves received by the transmission/reception antennas 230 is largely different between the part of the recording medium P where the image for detection 202 is formed and the part of the recording medium P where the image 200 is formed. For this reason, it may be possible to easily detect the recording medium P having the image for detection 202 formed thereon by the transmission/reception antennas 230.

As shown in FIG. 3, in the printed material detection apparatus 150, when the recording medium P having the image for detection 202 formed thereon passes between the transmission/reception antennas 156 and 158 and the radio wave absorbing body 154, at least a part of the radio waves is reflected on the image for detection 202. For this reason, it may be possible to detect the recording medium P having the image for detection 202 formed thereon by the transmission/reception antennas 156 and 158.

Note that, in the printed material detection apparatus 150, the radio wave absorbing body 154 is arranged but a radio wave reflecting plate may also be instead arranged. As the radio wave reflecting plate, for example, a metal plate such as stainless steel is used. Thereby, the radio waves may be easily reflected on the radio wave reflecting plate, so that the radio waves received by the transmission/reception antennas 156 and 158 increase. In this case, the image for detection 202 may be an image for detection that absorbs at least a part of the radio waves. Thereby, at least a part of the radio waves is absorbed by the image for detection 202, so that the radio waves received by the transmission/reception antennas 156 and 158 are reduced at a part corresponding to the image for detection 202. For this reason, it may be possible to detect the recording medium P having the image for detection 202 formed thereon by the transmission/reception antennas 156 and 158.

(Operations and Effects)

Subsequently, operations and effects of the present exemplary embodiment are described.

The printed material detection apparatus 150 is provided with the transmission/reception antennas 156 and 158 configured to transmit the radio waves whose frequency is equal to or higher than 1 GHz and equal to or lower than 5 THz toward the printed material and to detect reflection or absorption of the radio waves. For example, when a user who carries the recording medium P having the image for detection 202 formed thereon passes, at least a part of the radio waves is reflected or absorbed by the image for detection 202. Thereby, the recording medium P having the image for detection 202 formed thereon is detected by the transmission/reception antennas 156 and 158. Also, in a case where only the image 200 is formed on the recording medium P (in a case where the image for detection 202 is not formed), most of the radio waves pass through the part of the recording medium P where the image 200 is formed. For this reason, the recording medium is not detected by the transmission/reception antennas 156 and 158. The recording medium P is provided with the image for detection 202 by the second image forming unit 100 of the image forming apparatus 10, for example, and the recording medium P is not a special recording medium having a structure attached thereon or having a magnetic body embedded therein.

For this reason, the printed material detection apparatus 150 may detect the printed material without using a special recording medium.

In the printed material detection apparatus 150, the radio waves that are transmitted by the transmission/reception antennas 156 and 158 are the millimeter waves or the sub-millimeter waves. The millimeter waves or the sub-millimeter waves have lower output power and less affects a human body. For this reason, in the printed material detection apparatus 150, the radio waves may be handled more easily, as compared to a case where the detection unit transmits terahertz waves.

The printed material detection apparatus 150 also includes at least the two sets of the transmission/reception antennas 156 and 158 configured to transmit and receive the radio waves. The two sets of the transmission/reception antennas 156 and 158 are arranged on the different planes, and are also arranged so that the center lines 156A and 156B of the radio waves transmitted from the transmission/reception antennas 156 and 158 form an angle of 90° or smaller. For this reason, in the printed material detection apparatus 150, it may be possible to more easily detect the recording medium P having the image for detection 202 provided on, as compared to a case where one set of the transmission/reception antenna is provided.

In the printed material detection apparatus 150, the radio wave absorbing body 154 is arranged with respect to the transmission/reception antennas 156 and 158 so as to sandwich the position through which the recording medium P passes therebetween. Thereby, the radio waves transmitted from the transmission/reception antennas 156 and 158 collide with the radio wave absorbing body 154, so that at least a part of the radio waves is absorbed by the radio wave absorbing body 154. For this reason, in the printed material detection apparatus 150, the recording medium P having the image for detection 202 provided thereon may be more easily detected, as compared to a case where the radio waves transmitted from the transmission unit are likely to be reflected on a wall surface with the position through which the printed material passes being interposed therebetween.

The image forming apparatus 10 also includes the first image forming unit 12 configured to form an image on the recording medium P. The image forming apparatus 10 also includes the second image forming unit 100 configured to provide the image for detection 202 on the recording medium P. For the image for detection 202, the recording material having a reflectance or absorptivity of radio waves that is different from the recording material used for formation of an image in the first image forming unit 12 is used. In the image forming apparatus 10, for example, when the confidential management level of the image that is formed on the recording medium P by the first image forming unit 12 is higher than the predetermined level, the image for detection 202 is provided on the recording medium P by the second image forming unit 100.

In the image forming apparatus 10, the recording medium P having the image for detection 202 provided thereon is conveyed to a part facing the transfer unit 32, so that the toner image formed in the first image forming unit 12 is transferred to the recording medium P. Thereafter, the toner image on the surface of the recording medium P is heated and pressurized in the fixing device 34, so that the toner image is fixed on the surface of the recording medium P.

The recording medium P having the image for detection 202 provided thereon may be detected by the printed material detection apparatus 150. For this reason, in the image forming apparatus 10, a printed material that is detected by the printed material detection apparatus 150 may be manufactured without using a special recording medium. In the image forming apparatus 10, since the image for detection 202 is provided on the recording medium P by the second image forming unit 100, a thickness of apart of the recording medium P where the image for detection 202 is provided little changes. For this reason, as compared to a case where a structure such as an IC chip is attached to the recording medium or a magnetic body is embedded therein, handleability of the recording medium is difficult to be deteriorated.

In the image forming apparatus 10, the image for detection 202 is formed of a material that reflects or absorbs at least a part of the radio waves whose frequency is equal to or higher than 1 GHz and equal to or lower than 5 THz. For this reason, in the image forming apparatus 10, the recording medium P provided on the image for detection 202 may be more easily detected, as compared to a case where the management information is formed of a material that is difficult to reflect or absorb the radio waves whose frequency is equal to or higher than 1 GHz and equal to or lower than 5 THz.

In the image forming apparatus 10, the image for detection 202 is formed of a material that reflects or absorbs at least a part of millimeter waves or sub-millimeter waves as the radio waves. Since the millimeter waves or the sub-millimeter waves have low output power and less affect a human body, they may be easily used for the detection unit. For this reason, in the image forming apparatus 10, the recording medium P provided on the image for detection 202 may be more easily detected, as compared to a case where the management information is formed of a material that is difficult to reflect or absorb the millimeter waves or sub-millimeter waves.

The image forming apparatus 10 is provided with the transfer unit 32 configured to transfer the toner image formed by the first image forming unit 12 to the recording medium P, and the fixing device 34 configured to heat and pressurize the recording medium P on a downstream side with respect to the transfer unit 32 in the conveying direction of the recording medium P. In the image forming apparatus 10, the second image forming unit 100 is provided upstream with respect to the transfer unit 32 in the conveying direction of the recording medium P. Thereby, when the toner image transferred to the recording medium P by the transfer unit 32 is heated and pressurized by the fixing device 34, the image for detection 202 provided on the recording medium P by the second image forming unit 100 is also heated. For this reason, in the image forming apparatus 10, the material constituting the image for detection 202 may be more easily heated, as compared to a case where the second image forming unit is arranged downstream with respect to the provision unit for an image formed by the first image forming unit in the conveying direction of the print medium.

In the image forming apparatus 10, in a case of conveying the recording medium P along the reversal path 26, the second image forming unit 100 is arranged in a position facing the rear surface of the recording medium P. Thereby, it may be possible to form only the image 200 on the surface of the recording medium P, and to form the image for detection 202 on the rear surface of the recording medium P. Even when the image for detection 202 is formed on the rear surface of the recording medium P, the recording medium P having the image for detection 202 provided thereon is detected by the printed material detection apparatus 150. For this reason, in the image forming apparatus 10, the image for detection 202 is not overlapped with the image 200, as compared to a case where the management information is provided on the surface of the recording medium.

In the image forming apparatus 10, the image for detection 202 may also be configured by an invisible material (for example, a transparent material). For example, as the invisible material, indium tin oxide (ITO) and the like are used. Thereby, even when the surface of the recording medium P is formed with the image 200 and the image for detection 202, only the image 200 may be visually recognized and the image for detection 202 is not visually recognized. For this reason, in the image forming apparatus 10, the image for detection 202 does not interfere with the image 200, as compared to a case where the management information is formed of a visible material.

In the image forming apparatus 10, for example, in a case of forming the image for detection 202 on the rear surface of the recording medium P, the image for detection 202 may also be formed of a visible material. For this reason, in the image forming apparatus 10, the image for detection 202 does not interfere with the image 200, as compared to a case where the management information formed of the visible material is provided on the surface of the recording medium.

In the image forming apparatus 10, the image for detection 202 has a mesh pattern having a mesh size corresponding to a wavelength of the radio waves. For example, when the mesh size of the mesh pattern is set as appropriate, the radio waves are difficult to pass through the image for detection 202, and the recording medium P having the image for detection 202 provided thereon may be detected by the printed material detection apparatus 150. For this reason, in the image forming apparatus 10, it may be possible to reduce the material constituting the image for detection 202 (for example, an amount of ink) without lowering detection performance, as compared to a case where the management information is a solid image.

The image forming apparatus 10 includes the management information detection unit 102 configured to detect that the image for detection 202 is provided on the recording medium P, and the collection unit 104 configured to collect the recording medium P. In the image forming apparatus 10, for a confidential management level of an image for which the image for detection 202 should be provided, when it is not detected by the management information detection unit 102 that the image for detection 202 is provided on the recording medium P, the recording medium P is collected to the collection unit 104. For this reason, in the image forming apparatus 10, the recording medium P is suppressed from being discharged to the usual discharge part 10b, as compared to a case where it is not detected that the management information is provided on the recording medium. Therefore, when it is necessary to provide the image for detection 202 on the recording medium P, the recording medium P on which the image for detection 202 is not formed is suppressed from passing through the printed material detection apparatus 150.

The printed material detection system also includes the image forming apparatus 10 and the printed material detection apparatus 150. For this reason, in the printed material detection system, it may be possible to detect the recording medium P having the image for detection 202 provided thereon, without using a special recording medium.

Modified Exemplary Embodiments

Figure 8:
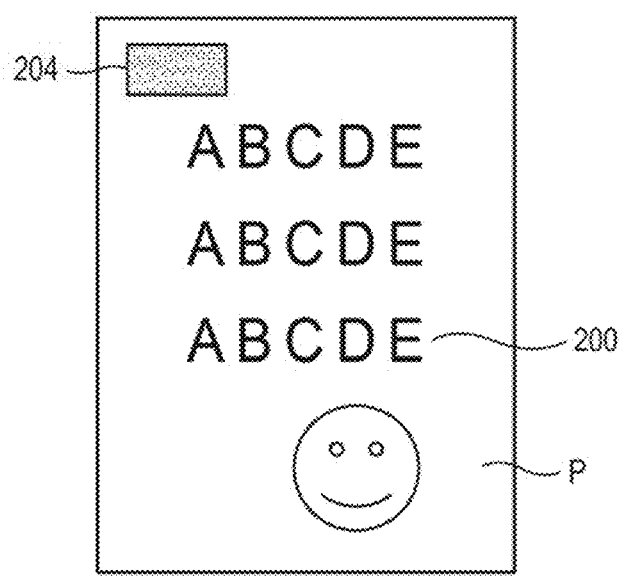
FIG. 8 depicts another example of the printed material on which an image for detection is provided together with an image.

FIG. 8 depicts an example of the image for detection that is provided on the recording medium P by the image forming apparatus 10, as a modified exemplary embodiment. Note that, the same constitutional parts as the first exemplary embodiment are denoted with the same reference signs, and the descriptions thereof are omitted.

As shown in FIG. 8, the surface of the recording medium P is formed with the image 200, and an image for detection 204 as an example of the management information is provided on a right upper portion of the recording medium P. The image for detection 204 is a rectangular solid image. A recording material constituting the image for detection 204 is similar to the recording material constituting the image for detection 202 on the first exemplary embodiment.

Thereby, the recording medium P having the image for detection 204 formed thereon is detected by the printed material detection apparatus 150. For this reason, it may be possible to realize the similar operations and effects to the first exemplary embodiment by the similar configurations to the first exemplary embodiment.

Second Exemplary Embodiment

Subsequently, a printed material detection apparatus of a second exemplary embodiment is described with reference to FIGS. 9 and 10. Note that, the same constitutional parts as the first exemplary embodiment are denoted with the same reference signs, and the descriptions thereof are omitted.

Figure 9:
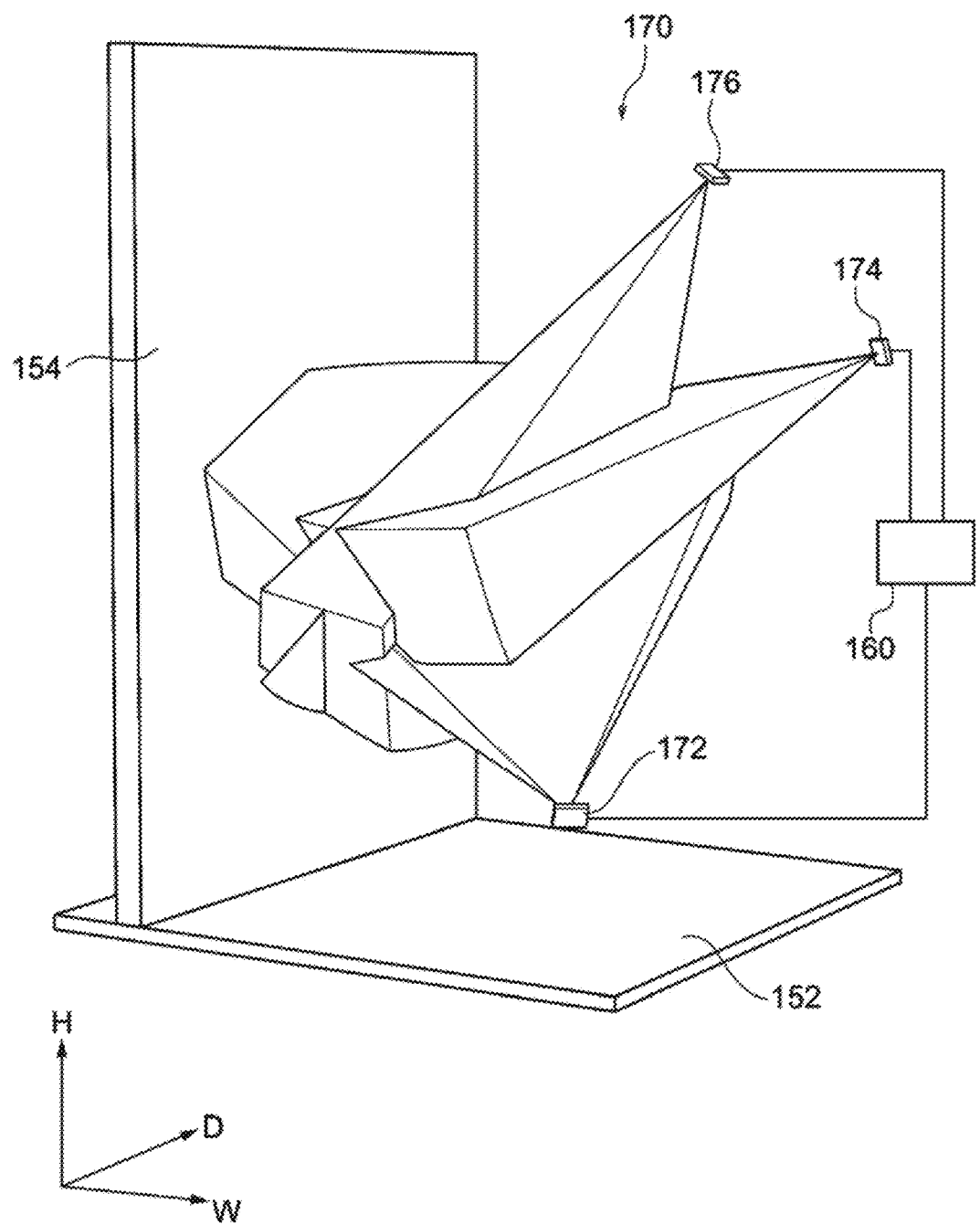
FIG. 9 is a perspective view depicting a printed material detection apparatus in accordance with a second exemplary embodiment.
Figure 10:
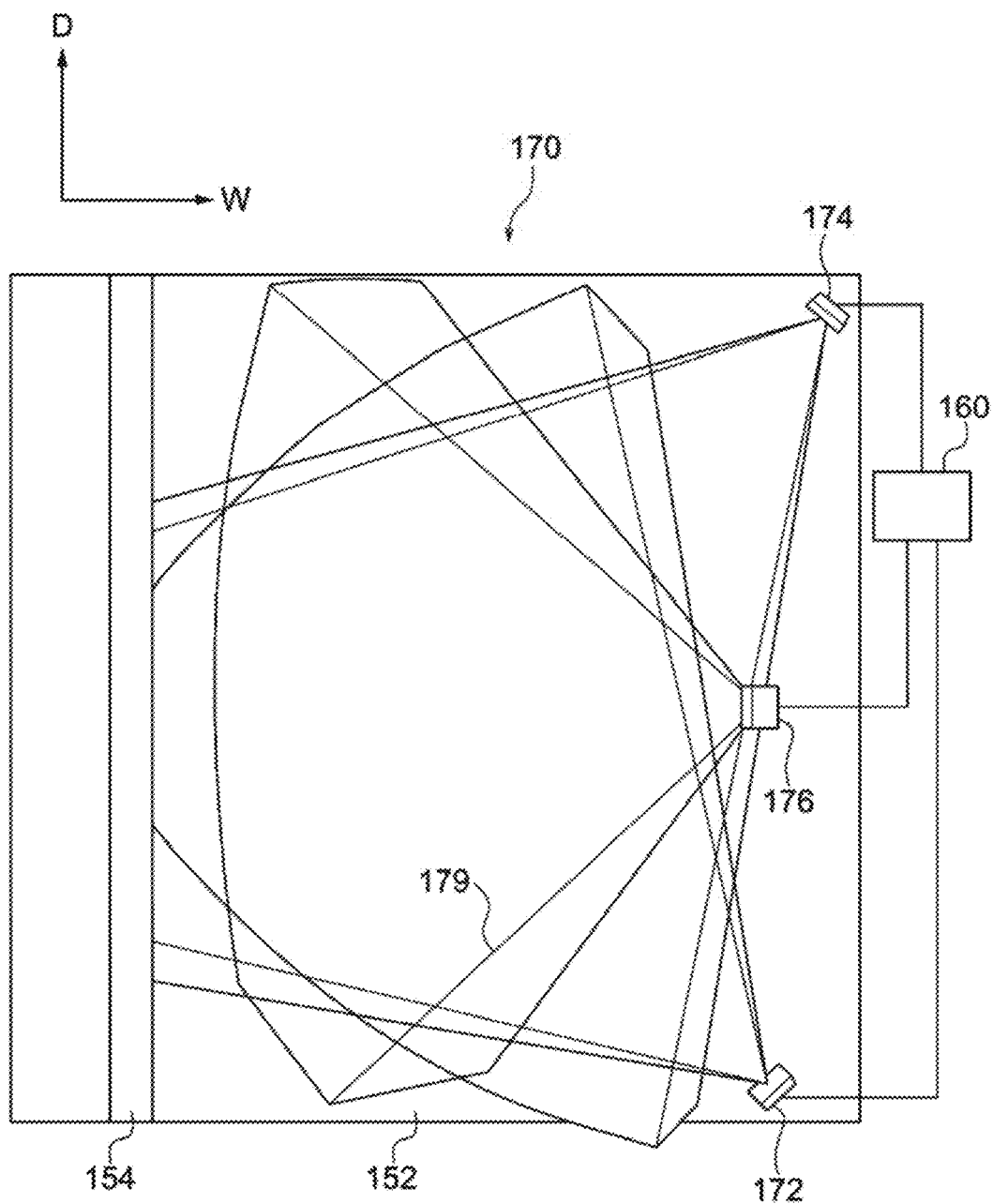
FIG. 10 is a plan view of the printed material detection apparatus of the second exemplary embodiment.

As shown in FIGS. 9 and 10, a printed material detection apparatus 170 of the second exemplary embodiment includes three sets of transmission/reception antennas 172, 174 and 176. The transmission/reception antennas 172, 174 and 176 are examples of the detection unit.

The transmission % reception antennas 172, 174 and 176 are arranged in positions distant from the radio wave absorbing body 154 and at heights different in the upper and lower direction (refer to FIG. 9). The transmission/reception antenna 172, 174 and 176 are also arranged at intervals along the radio wave absorbing body 154, in a plan view shown in FIG. 10. The transmission/reception antenna 172, 174 and 176 are also arranged on different planes (refer to FIG. 9).

The transmission/reception antenna 172 is configured to transmit radio waves obliquely upward from the floor surface 152-side toward the radio wave absorbing body 154 and to receive reflected radio waves. The transmission/reception antenna 174 is configured to transmit radio waves obliquely downward from a side distant from the floor surface 152 toward the radio wave absorbing body 154 and to receive reflected radio waves. The transmission/reception antenna 176 is also configured to transmit radio waves obliquely downward from a side distant from the floor surface 152 toward the radio wave absorbing body 154 and to receive reflected radio waves. The three sets of the transmission/reception antennas 172, 174 and 176 are arranged so that a center line of the radio waves transmitted from the transmission/reception antenna 172, a center line of the radio waves transmitted from the transmission/reception antenna 174 and a center line of the radio waves transmitted from the transmission/reception antenna 176 are each at an angle equal to or smaller than 90 in an X-direction, a Y-direction and a Z-direction, which are any three-dimensional coordinates. The center line of the radio waves transmitted from the transmission/reception antenna 172, the center line of the radio waves transmitted from the transmission/reception antenna 174 and the center line of the radio waves transmitted from the transmission/reception antenna 176 may be arranged at an angle equal to or greater than 30° in the X-direction, the Y-direction and the Z-direction, which are any three-dimensional coordinates. The radio waves transmitted from transmission/reception antennas 172, 174 and 176 form an overlapping part 179 of a three-dimensional space.

The radio waves that are transmitted from the transmission/reception antennas 172, 174 and 176 are radio waves whose frequency is equal to or higher than 1 GHz and equal to or lower than 5 THz. In an example of the exemplary embodiment of the present disclosure, the radio waves that are transmitted from the transmission/reception antennas 172, 174 and 176 are millimeter waves.

The other configurations of the printed material detection apparatus 170 are similar to the printed material detection apparatus 150 of the first exemplary embodiment.

The printed material detection apparatus 170 realizes following operations and effects, in addition to the operations and effects by the similar configurations to the printed material detection apparatus 150 of the first exemplary embodiment.

The printed material detection apparatus 170 includes the three sets of the transmission/reception antennas 172, 174 and 176 arranged on the different planes. The three sets of the transmission/reception antennas 172, 174 and 176 are arranged so that the center lines of the radio waves transmitted from the transmission/reception antennas 172, 174 and 176 are each at an angle equal to or smaller than 90° in the X-direction, the Y-direction and the Z-direction, which are any three-dimensional coordinates. For this reason, in the printed material detection apparatus 170, the recording medium P having the image for detection 202 provided thereon may be more easily detected, as compared to a case where two sets of transmission/reception antennas are provided.

Third Exemplary Embodiment

Subsequently an image forming apparatus of a third exemplary embodiment is described with reference to FIG. 11. Note that, the same constitutional parts as the first exemplary embodiment and the second exemplary embodiment are denoted with the same reference signs, and the descriptions thereof are omitted.

Figure 11:
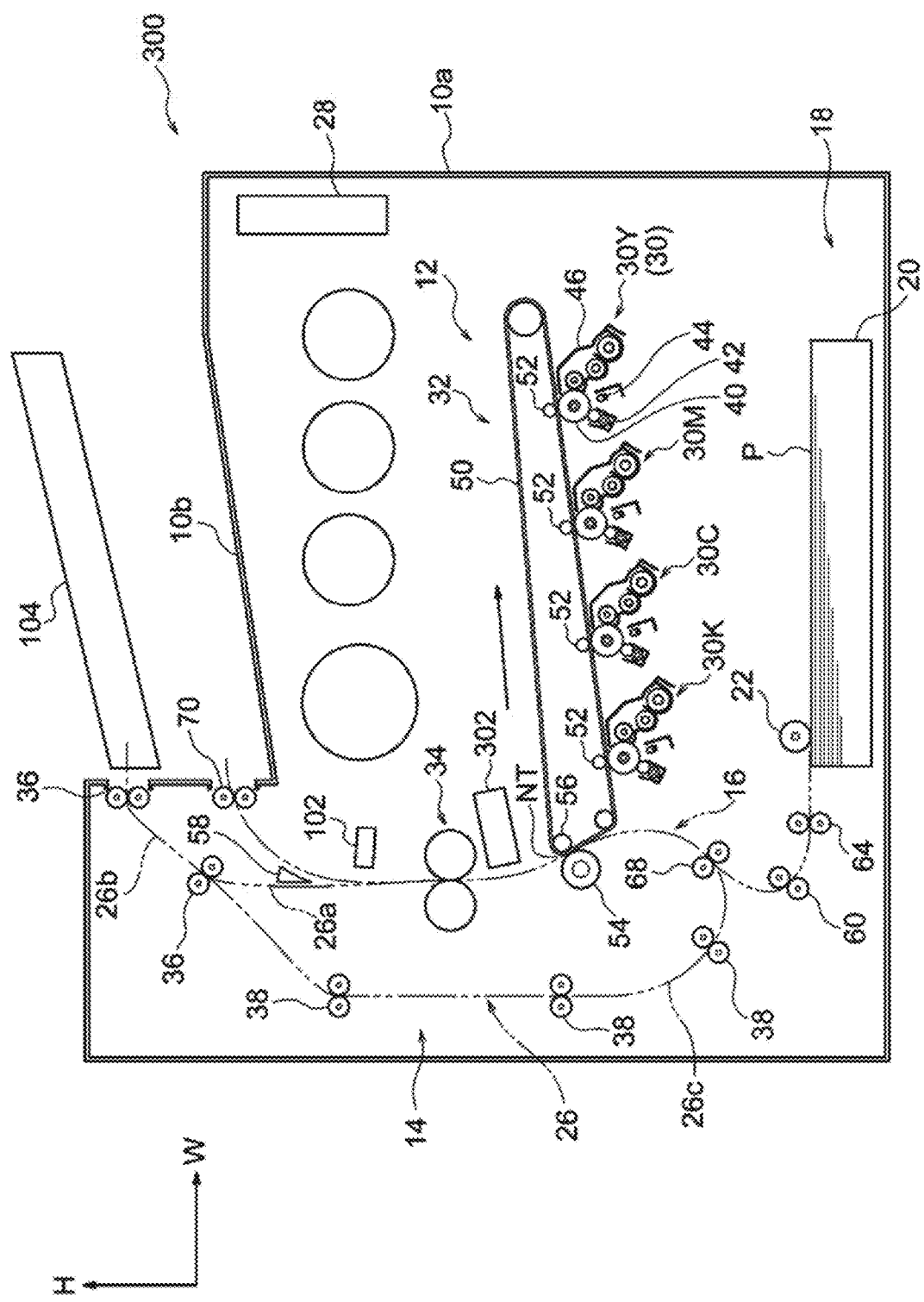
FIG. 11 is a schematic view depicting an image forming apparatus in accordance with a third exemplary embodiment.

As shown in FIG. 11, an image forming apparatus 300 of the third exemplary embodiment includes a second image forming unit 302, instead of the second image forming unit 100 of the image forming apparatus 10 of the first exemplary embodiment. The second image forming unit 302 is arranged downstream with respect to the transfer unit 32 for the toner image formed by the first image forming unit 12 in the conveying direction of the recording medium P. The second image forming unit 302 is arranged upstream with respect to the fixing device 34 in the conveying direction of the recording medium P.

The configuration of the second image forming unit 302 is similar to the second image forming unit 100 of the first exemplary embodiment. The second image forming unit 302 is configured to provide the image for detection 202 (refer to FIG. 2) as an example of the management information on the recording medium P.

In the image forming apparatus 300, the toner image formed in the first image forming unit 12 is transferred to the recording medium P by the transfer unit 32. Also, when a confidential management level of an image is higher than the predetermined level, the second image forming unit 302 provides the image for detection 202 on the recording medium P. Then, the toner image on the surface of the recording medium P is heated and pressurized by the fixing device 34, so that the toner image is fixed on the surface of the recording medium P.

The image forming apparatus 300 realizes following operations and effects, in addition to the operations and effects by the similar configurations to the image forming apparatus 10 of the first exemplary embodiment.

In the image forming apparatus 30), the second image forming unit 302 is arranged downstream with respect to the transfer unit 32 for the toner image formed by the first image forming unit 100 in the conveying direction of the recording medium P. For this reason, in the image forming apparatus 300, the image 200 is suppressed from being formed on the image for detection 202, as compared to a case where the second image forming unit is arranged upstream with respect to the provision unit for an image formed by the first image forming unit in the conveying direction of the print medium.

Fourth Exemplary Embodiment

Subsequently, an image forming apparatus of a fourth exemplary embodiment is described with reference to FIG. 12. Note that, the same constitutional parts as the first exemplary embodiment to the third exemplary embodiment are denoted with the same reference signs, and the descriptions thereof are omitted.

Figure 12:
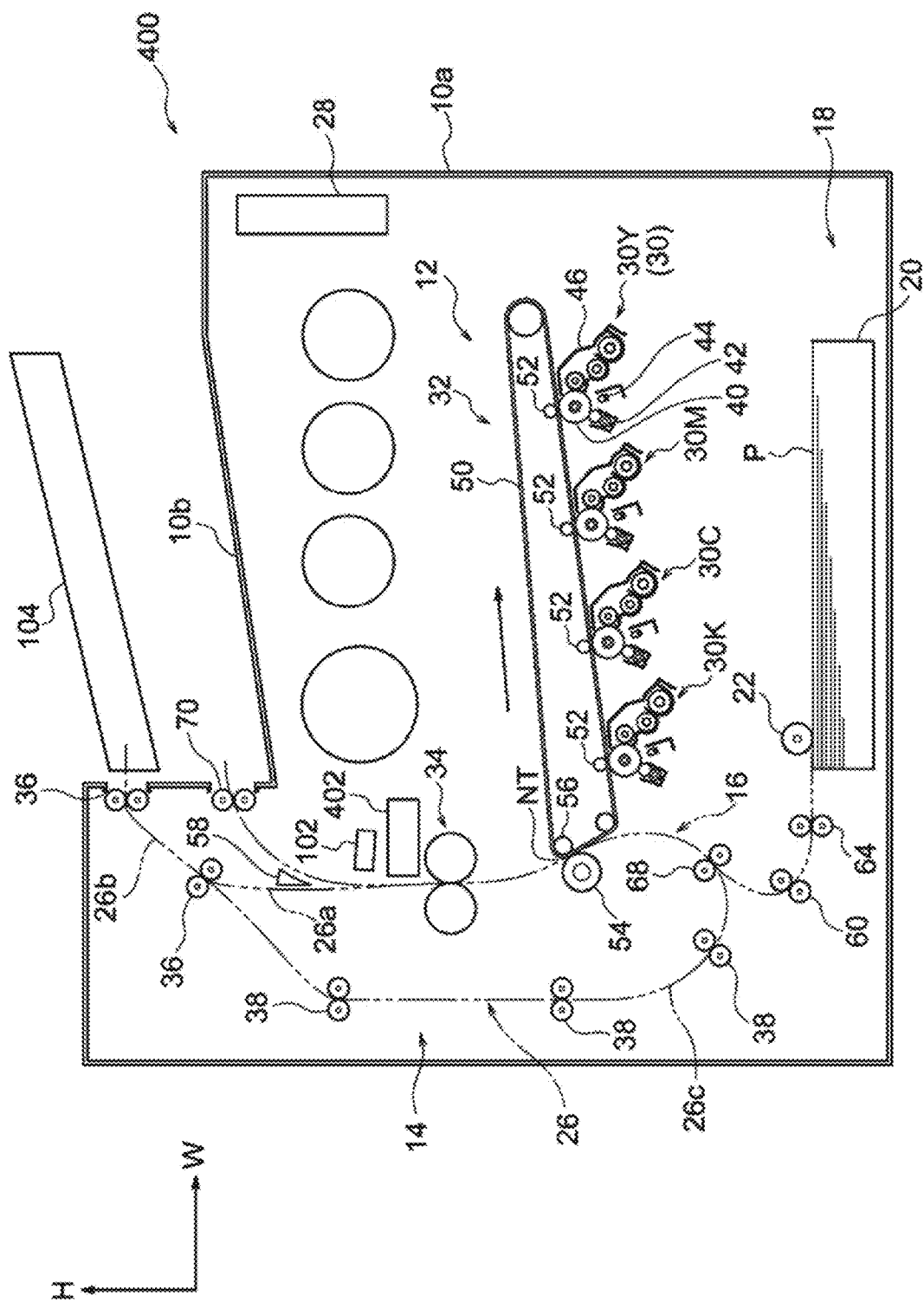
FIG. 12 is a schematic view depicting an image forming apparatus in accordance with a fourth exemplary embodiment.

As shown in FIG. 12, an image forming apparatus 400 of the fourth exemplary embodiment includes a second image forming unit 402, instead of the second image forming unit 100 of the image forming apparatus 10 of the first exemplary embodiment. The second image forming unit 402 is arranged downstream with respect to the transfer unit 32 for the toner image formed by the first image forming unit 12 in the conveying direction of the recording medium P. The second image forming unit 402 is arranged downstream with respect to the fixing device 34 and upstream of a part facing the management information detection unit 102 in the conveying direction of the recording medium P.

The configuration of the second image forming unit 402 is similar to the configuration of the second image forming unit 100 of the first exemplary embodiment. The second image forming unit 402 is configured to provide the image for detection 202 (refer to FIG. 2) as an example of the management information on the recording medium P.

In the image forming apparatus 400, the toner image formed in the first image forming unit 12 is transferred to the recording medium P by the transfer unit 32. Then, the toner image on the surface of the recording medium P is heated and pressurized by the fixing device 34, so that the toner image is fixed on the surface of the recording medium P. Also, when a confidential management level of an image is higher than the predetermined level, the second image forming unit 402 provides the image for detection 202 on the recording medium P.

The image forming apparatus 400 realizes following operations and effects, in addition to the operations and effects by the similar configurations to the image forming apparatus 10 of the first exemplary embodiment.

In the image forming apparatus 400, the second image forming unit 402 is arranged downstream with respect to the transfer unit 32 for the toner image formed by the first image forming unit 100 in the conveying direction of the recording medium P. For this reason, in the image forming apparatus 400, the image 200 is suppressed from being formed on the image for detection 202, as compared to a case where the second image forming unit is arranged upstream with respect to the provision unit for an image formed by the first image forming unit in the conveying direction of the print medium. Also, the second image forming unit 402 is arranged downstream with respect to the fixing device 34 in the conveying direction of the recording medium P, so that the image for detection 202 provided on the recording medium P is not heated and pressurized. For this reason, for example, in a case where it is not necessary to heat the image for detection 202 or even in a case where a characteristic of the image for detection 202 is changed by heating, it may be possible to form the image for detection 202 on the recording medium P.

In the third and fourth exemplary embodiments, the image for detection 202 (refer to FIG. 2) is provided on the recording medium P. However, the present disclosure is not limited thereto. For example, the image for detection 204 (refer to FIG. 8) may also be provided on the recording medium P.

In the printed material detection apparatuses 150 and 170 of the first and second exemplary embodiments, the radio wave absorbing body 154 is arranged. However, instead, a radio wave reflecting plate may also be arranged. As the radio wave reflecting plate, for example, a metal plate such as stainless steel is used. Thereby, an amount of radio waves reflected on the radio wave reflecting plate and received by the transmission/reception antenna increases. In this case, the image for detection 202 may be an image for detection that absorbs at least a part of the radio waves. Thereby, since at least a part of the radio waves is absorbed by the image for detection 202, the radio waves that are received by the transmission/reception antenna are reduced at a part corresponding to the image for detection 202. For this reason, it may be possible to detect the recording medium P having the image for detection 202 formed thereon by the transmission/reception antenna.

The shape and position of the image for detection as an example of the management information that is provided on the recording medium P are not limited to the shapes and positions of the images for detection 202 and 204 of the first exemplary embodiment and the modified exemplary embodiment, and may be changed. For example, in a case where the image for detection is provided on the surface of the recording medium P, a shape such as a patch, a mesh pattern and a stripe pattern may be arranged in a position in which recording and reading of a document are not disturbed. In a case where the image for detection is formed on the surface of the recording medium P, a frame shape along an edge portion of the recording medium P may also be possible, for example. In a case where the image for detection is formed on the rear surface of the recording medium, a shape such as a solid coating on an entire surface, a mesh pattern on an entire surface and a stripe pattern on an entire surface may be from a standpoint of preventing the image for detection from being cut and taken out, for example. Here, the mesh pattern or stripe pattern is formed as a pattern that may reflect or absorb radio waves irradiated by the detection unit.

The image for detection that is provided on the recording medium of the present disclosure may configure a document (for example, a word, a sentence, a figure and the like), and may also configure a document (for example, "confidential document", a word such as "confidential", a figure indicative of the confidential information, and the like) meaning that the recording medium has confidential information, for example. The document configured by the image for detection may be inserted in a sentence of the confidential information or arranged at appropriate intervals on the entire rear surface of the recording medium, from the standpoint of preventing the image for detection from being cut and taken out.

Note that, although the present invention has been described in detail with reference to the specific exemplary embodiments, it is obvious to one skilled in the art that the present invention is not limited to the specific exemplary embodiments and a variety of other exemplary embodiments may be made within the scope of the present invention. For example, the exemplary embodiments have been described in which the control unit 28 determines whether the confidential management level of an image is higher than the predetermined level, according to the image data that is formed by the first image forming unit 12. However, the confidential management level may also be designated upon printing.

EXAMPLES

In the below, the recording material and the recording medium of the present disclosure are further specifically described with reference to Examples. However, the recording material and the recording medium of the present disclosure are not limited to Examples as long as the gist thereof is not exceeded.

Example 1: Detection of Recording Medium Having Ag Nano-Ink Image by Millimeter Wave Radar For a recording medium having an Ag nano-ink image, it is evaluated whether the recording medium could be detected by a millimeter wave radar.

As Ag nano-ink, "Circuitry Marker" (a pen-shaped device in which Ag nano-ink is charged) available from Mitsubishi Paper Mills Limited is prepared. As paper on which an image is formed, "EPSON Machjet glossy paper" was prepared. A mesh pattern image of Ag nano-ink having a vertical width of about 5 mm and a horizontal width of about a 5 mm was manually formed on one surface of the paper. The paper after image formation was cut into a square of 10 cm×10 cm at the center, so that a recording medium having a mesh pattern image formed on one entire surface was obtained.

As the detection unit, the TI module of "79 HGz radar module evaluation kit TITAL series" available from Sharp Takaya Electronic Industry Co., Ltd was used.

A copper plate was equipped at a position of 1 m distant from the detection unit, and used as a wall surface. A sample was provided in a position of 50 cm distant from the detection unit between the detection unit and the wall surface.

The millimeter waves having an output of 20 dBm (250 mW) and a frequency of 79 GHz were irradiated from the detection unit, and the intensity of reflected waves was measured by scanning about 30° in the horizontal direction with the phased array antenna of the detection unit. The results are shown in FIGS. 13A, 13 B, and 13C.

Figure 13A:
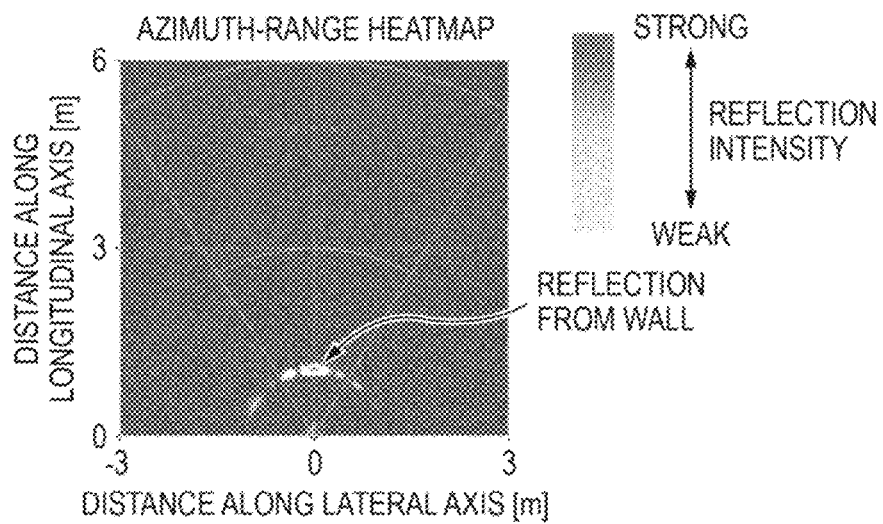
FIG. 13A is an image showing an observation result in Example 1.

FIG. 13A: No sample. The reflected waves from the wall were observed.

Figure 13B:
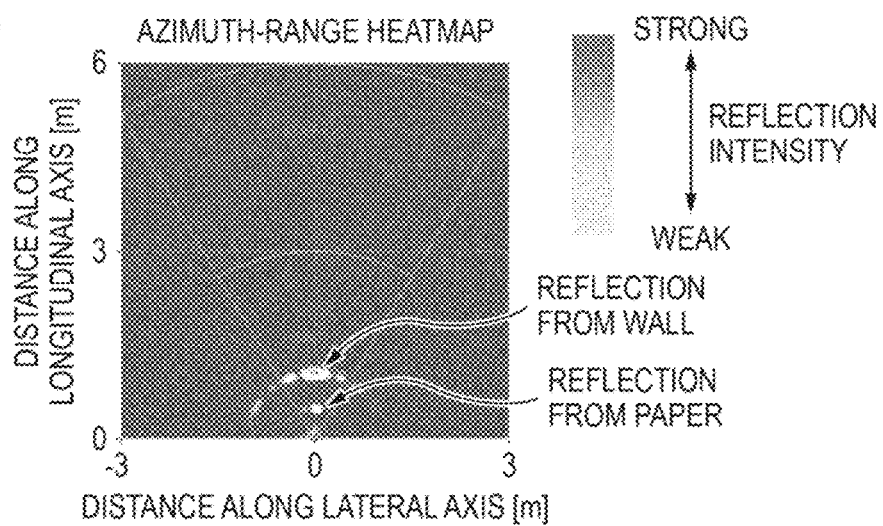
FIG. 13B is an image showing an observation result in Example 1.

FIG. 13B: Paper. The reflected waves from the paper were observed, separately from the reflected waves from the wall.

Figure 13C:
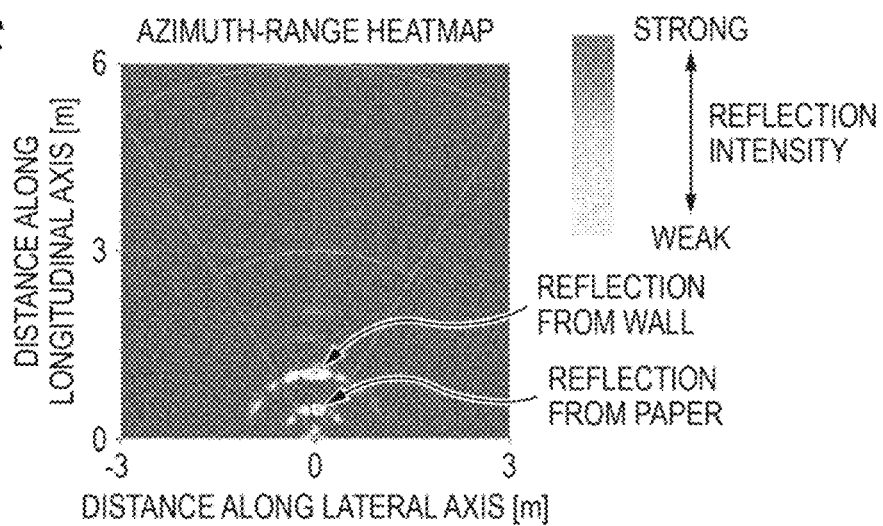
FIG. 13C is an image showing an observation result in Example 1.

FIG. 13C: The recording medium having a mesh pattern image of Ag nano-ink. The reflected waves from the recording medium were observed, separately from the reflected waves from the wall. The reflection intensity of the recording medium having a mesh pattern image of Ag nano-ink was stronger than the reflection intensity of the paper. It could be confirmed that the recording medium having a mesh pattern image of Ag nano-ink could be detected by the millimeter wave radar.

Example 2: Comparison of Ag Nano-Ink Image and Toner Image

As the recording material, Ag nano-ink ("Circuitry Marker" available from Mitsubishi Paper Mills Limited; a pen-shaped device in which Ag nano-ink is charged), and "CT202676" (yellow), "CT202675" (magenta), "CT202674" (cyan) and "CT202673" (black) that are toner cartridges available from Fuji Xerox Co., Ltd. were prepared. As paper on which an image is formed. "C2 plain paper" available from Fuji Xerox Co., Ltd. was prepared. As the electrophotographic image forming apparatus, "ApeosPort-IV C5575" available from Fuji Xerox Co., Ltd. was prepared.

Following images were formed on one surface of the paper by using each of the recording materials, the paper after image formation was cut into a square of 10 cm×10 cm at the center, so that a recording medium having an image formed on one entire surface was obtained. (a) and (b) are the images for detection in accordance with the present exemplary embodiment, and (c) to (h) are images for comparison.

(a) Ag nano-ink was manually solid-coated.

(b) A mesh pattern having a vertical width of about 5 mm and a horizontal width of about a 5 mm was manually formed with Ag nano-ink.

(c) the image forming apparatus, black toner was solid-coated in two layers.

(d) With the image forming apparatus, black toner was solid-coated in four layers.

(e) With the image forming apparatus, black toner was solid-coated in six layers.

(f) With the image forming apparatus, cyan toner was solid-coated in six layers.

(g) With the image forming apparatus, magenta toner was solid-coated in six layers.

(h) With the image forming apparatus, yellow toner was solid-coated in six layers.

Figure 14:
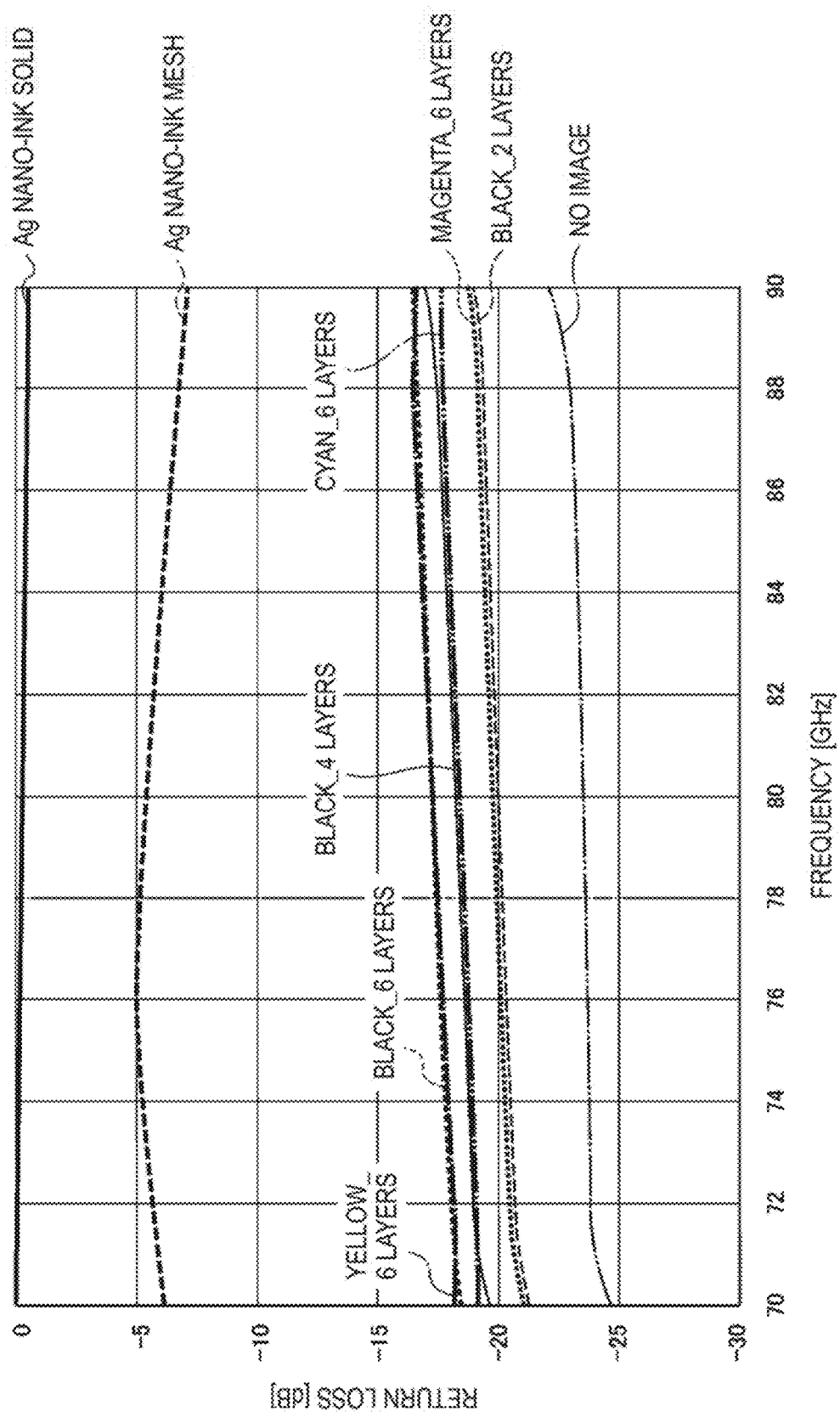
FIG. 14 is images showing an observation result in Example 2.

By using "T14_01120112_2R5D" available from Sharp Takaya Electronic Industry Co., Ltd., the millimeter waves having an output of 20 dBm and a frequency in a range from 70 GHz to 90 GHz were irradiated toward the recording medium from a distance of 0.5 m, and a return loss (dB) was evaluated. FIG. 14 depicts the return loss of each recording medium.

The recording medium having the solid image of Ag nano-ink substantially totally reflected the millimeter waves having a frequency from 70 GHz to 90 GHz over the substantially entire region. The recording medium having the mesh pattern image of Ag nano-ink had a mesh pattern corresponding to the frequency to be irradiated, so that it substantially totally reflected the millimeter waves having a frequency from 70 GHz to 90 GHz over the substantially entire region.

While a difference between the return loss of the paper and the return loss of the recording medium having the toner image was about 5 dB, a difference between the return loss of the paper and the return loss of the recording medium having the solid image of Ag nano-ink was about 25 dB. It could be confirmed that the recording medium having the Ag nano-ink image could be identified from a recording medium having only a general toner image by the millimeter wave radar.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printed material detection apparatus comprising:
   a detector configured to transmit radio waves whose frequency is 1 GHz or more and 5 THz or less toward a printed material and to detect reflection or absorption of the radio waves, wherein
   the detector comprises at least two sets of antennas configured to transmit and receive the radio waves, and
   the at least two sets of antennas are arranged on different planes and are arranged so that center lines of the radio waves transmitted from the at least two sets of the antennas form an angle of 90° or less.

2. The printed material detection apparatus according to claim 1, wherein
   the radio waves transmitted by the detector are millimeter waves or sub-millimeter waves.

3. The printed material detection apparatus according to claim 1, wherein
   the at least two sets of antennas include three sets of antennas, and
   the three sets of antennas are arranged so that center lines of the radio waves transmitted from the three sets of the antennas are arranged at an angle of 90° or less in an X-direction, a Y-direction and a Z-direction which are any three-dimensional coordinates.

4. A printed material detection apparatus comprising:
   a detector configured to transmit radio waves whose frequency is 1 GHz or more and 5 THz or less toward a printed material and to detect reflection or absorption of the radio waves; and
   a radio wave absorbing body, wherein
   the detector comprises a transmitter configured to transmit the radio waves, and
   the radio wave absorbing body is arranged such that the radio wave absorbing body and the transmitter sandwich a position through which the printed material passes.

5. An image forming apparatus comprising:
   a first image former configured to form an image on a print medium using a first recording material;
   a second image former configured to provide management information to the print medium using a second recording material having a reflectance or absorptivity of radio waves different from a reflectance or absorptivity of radio waves of the first recording material;
   a management information detector configured to detect whether the management information is provided to the print medium; and
   a collector configured to collect the print medium in a case where the management information detector does not detect the management information on the print medium to which the management information is to be provided.

6. The image forming apparatus according to claim 5, wherein
   the second recording material reflects or absorbs at least a part of radio waves whose frequency is 1 GHz or more and 5 THz or less.

7. The image forming apparatus according to claim 6, wherein
   the second recording material reflects or absorbs at least a part of millimeter waves or sub-millimeter waves as the radio waves.

8. The image forming apparatus according to claim 5, wherein the first image former comprises:
   a provider configured to provide an image to the print medium, and
   a heater configured to heat the print medium,
   the heater is arranged downstream with respect to the provider in a conveying direction of the print medium, and
   the second image former is arranged upstream with respect to the provider in the conveying direction of the print medium.

9. The image forming apparatus according to claim 8, wherein
   the second recording material is an invisible material.

10. The image forming apparatus according to claim 5, wherein
    the first image former comprises a provider configured to provide the print medium with an image, and
    the second image former is arranged downstream with respect to the provider in a conveying direction of the print medium.

11. The image forming apparatus according to claim 5, wherein
    the second image former is arranged at a position facing a rear surface of the print medium.

12. The image forming apparatus according to claim 11, wherein
    the second recording material is a visible material.

13. The image forming apparatus according to claim 5, wherein
   the management information is provided as a solid image.

14. The image forming apparatus according to claim 5, wherein
   the management information is provided as an image having a mesh pattern, the mesh pattern having a mesh size corresponds to a wavelength of the radio waves.

15. A printed material detection system comprising:
   the image forming apparatus according to claim 5; and
   a printed material detection apparatus including a detector configured to transmit radio waves whose frequency is 1 GHz or more and 5 THz or less toward a printed material and to detect reflection or absorption of the radio waves.

* * * * *